US007734045B2

(12) United States Patent (10) Patent No.: US 7,734,045 B2
Sandhu et al. (45) Date of Patent: Jun. 8, 2010

(54) MULTIFACTOR SPLIT ASYMMETRIC CRYPTO-KEY WITH PERSISTENT KEY SECURITY

(75) Inventors: Ravinderpal Singh Sandhu, Oak Hill, VA (US); Brett Jason Schoppert, Leesburg, VA (US); Ravi Ganesan, Half Moon Bay, CA (US); Mihir Bellare, San Diego, CA (US); Colin Joseph Desa, Herndon, VA (US)

(73) Assignee: Tricipher, Inc., San Mateo, CA (US)

( * ) Notice: Subject to any disclaimer, the term of this patent is extended or adjusted under 35 U.S.C. 154(b) by 1069 days.

(21) Appl. No.: 11/381,829

(22) Filed: May 5, 2006

(65) Prior Publication Data

US 2007/0258585 A1 Nov. 8, 2007

(51) Int. Cl.
  *H04L 9/00* (2006.01)
  *H04L 29/06* (2006.01)
(52) U.S. Cl. ........................... 380/44; 713/155
(58) Field of Classification Search ............ 380/44, 380/45, 28, 30, 286, 277, 282; 713/155, 713/171, 156; 726/3–7
  See application file for complete search history.

(56) References Cited

U.S. PATENT DOCUMENTS

| 5,588,061 | A | * | 12/1996 | Ganesan et al. .......... 380/30 |
| 5,623,546 | A | | 4/1997 | Hardy et al. |
| 5,748,735 | A | * | 5/1998 | Ganesan ................ 713/165 |
| 6,026,163 | A | | 2/2000 | Micali |
| 6,317,834 | B1 | | 11/2001 | Gennaro et al. |
| 6,609,198 | B1 | | 8/2003 | Wood et al. |
| 6,901,512 | B2 | * | 5/2005 | Kurn et al. ............ 713/164 |

(Continued)

FOREIGN PATENT DOCUMENTS

WO  WO 00/49768  8/2000

OTHER PUBLICATIONS

Thomas Wu, The Secure Remote Password Protocol, Nov. 11, 1997, Computer Science Department, Stanford University, p. 1-16.*

(Continued)

*Primary Examiner*—Ellen Tran
*Assistant Examiner*—Samuel Ambaye
(74) *Attorney, Agent, or Firm*—Alfred A. Stadnicki; Antonelli, Terry, Stout & Kraus, LLP.

(57) ABSTRACT

A processor generates an asymmetric crypto-key, such as an RSA crypto-key, which is associated with the user and includes a private key and a public key. It computes a first key portion based on a stored random number generation function, which has one or more constants such as a salt and/or iteration count, and a first value of a constant, and a second key portion based on the computed first key portion and one of the private key and the public key. It additionally computes another first key portion based on the stored random number generation function and a second value of that constant, and another second key portion based on the computed other first key portion and the one key. The computed first and second key portions and the computed other first and second key portions form first and second splits of the one key of the asymmetric crypto-key.

20 Claims, 14 Drawing Sheets

U.S. PATENT DOCUMENTS

| | | | |
|---|---|---|---|
| 7,007,050 B2 * | 2/2006 | Saarinen | 708/250 |
| 7,260,724 B1 | 8/2007 | Dickinson et al. | |
| 2002/0076042 A1 | 6/2002 | Sandhu et al. | |
| 2002/0078344 A1 | 6/2002 | Sandhu et al. | |
| 2002/0078345 A1 * | 6/2002 | Sandhu et al. | 713/155 |
| 2004/0088260 A1 | 5/2004 | Foster et al. | |
| 2006/0064377 A1 | 3/2006 | Ganesan et al. | |
| 2006/0083370 A1 | 4/2006 | Hwang | |
| 2006/0285683 A1 | 12/2006 | Anatharaman et al. | |

OTHER PUBLICATIONS

Branovic et al., A workload characterization of Elliptic Curve Cryptography Methods in Embedded Environment, Jun. 2004, ACM, vol. 32, No. 3.*

Chen et al., "Applications of Multiple Trust Authorities in Pairing Based Cryptosystems", 2002, pp. 260-275.

* cited by examiner

MULTIFACTOR SPLIT ASYMMETRIC CRYPTO-KEY WITH PERSISTENT KEY SECURITY

RELATED APPLICATIONS

This application is related to U.S. application Ser. No. 11/381,878, filed concurrently herewith, and entitled "SECURE LOGIN USING A MULTIFACTOR SPLIT ASYMMETRIC CRYPTO-KEY WITH PERSISTENT KEY SECURITY", the contents of which are incorporated herein in their entirety by reference.

This application is also related to U.S. application Ser. No. 11/332,204, filed Jan. 17, 2006, and entitled "MULTIFACTOR SPLIT ASYMMETRIC CRYPTO-KEY WITH ROLLING KEY SECURITY", the contents of which are incorporated herein in their entirety by reference.

This application is also related to U.S. application Ser. No. 11/055,987 filed Feb. 14, 2005, and entitled "ARCHITECTURE FOR ASYMMETRIC CRYPTO-KEY STORAGE", U.S. application Ser. No. 11/055,986, filed Feb. 14, 2005, and entitled "TECHNIQUE FOR ASYMMERIC CRYPTO-KEY GENERATION", U.S. application Ser. No. 11/056,120, filed Feb. 14, 2005, and entitled "MULTIPLE FACTOR PRIVATE PORTION OF AN ASYMMETRIC KEY", U.S. application Ser. No. 11/055,988, filed Feb. 14, 2005, and entitled "AUTHENTICATION PROTOCOL USING A MULTI-FACTOR ASYMMETRIC KEY PAIR", U.S. application Ser. No. 11/056,116, filed Feb. 14, 2005, and entitled "ROAMING UTILIZING AN ASYMMETRIC KEY PAIR", U.S. application Ser. No. 11/056,114, filed Feb. 14, 2005, and entitled "ASYMMETRIC KEY PAIR HAVING A KIOSK MODE", and U.S. application Ser. No. 11/056,115, filed Feb. 14, 2005, and entitled "TECHNIQUE FOR PROVIDING MULTIPLE LEVELS OF SECURITY", the contents of which are incorporated herein in their entirety by reference.

TECHNICAL FIELD

This invention relates to cryptography. More particularly, the present invention relates to asymmetric cryptography with multi-factor split private keys that are less vulnerable to reuse by an attacker.

BACKGROUND ART

Today, computing devices are almost always interconnected via networks. These networks can be large closed networks, as within a corporation, or truly public networks, as with the Internet. A network itself might have hundreds, thousands or even millions of potential users. Consequently it is often required to restrict access to any given networked computer or service, or a part of a networked computer or service, to a subset of the users on the public or closed network. For instance, a brokerage might have a public website accessible to all, but would like to only give Ms. Alice Smith access to Ms. Alice Smith's brokerage account.

Access control is an old problem, tracing its roots to the earliest days of computers. Passwords were among the first techniques used, and to this day remain the most widely used, for protecting resources on a computer or service.

Single-Factor Authentication

In its simplest form, known as single factor authentication, every user has a unique password and the computer has knowledge of the user password. When attempting to log on, Alice would enter her userid, say alice, and password, say apple23, the computer would compare the pair, i.e. alice, apple23, with the pair it had stored for Alice, and if there is a match would establish a session and give Alice access.

This simple scheme suffers from two problems. First, the table containing the passwords is stored on the computer, and thus represents a single point of compromise. If Eve could somehow steal this table, she would be able to access every user's account. A second problem with this approach is that when Alice enters her password it travels from her terminal to the computer in the clear, and Eve could potentially eavesdrop. Such eavesdropping is known as a Man-In-The-Middle attack. For instance the terminal could be Alice's PC at home, and the computer could be a server on the Internet, in which case her password travels in the clear on the Internet. It will be recognized by those with ordinary skill in the art that a Man-in-The-Middle attack can go beyond eavesdropping, to modifying the contents of the communication.

Various solutions have been proposed and implemented to address these two issues. For instance, to address the first problem of storing the password on the computer, the computer could instead store a one way function of the password, e.g. F(apple23)=XD45DTY, and the pair {alice, XD45DTY}. In this example as F(apple23) is a one way function, computing XD45DTY from apple23 is easy, but as it is a "one way function", the reverse is believed to be computationally difficult or close to impossible. So when Alice logs on and sends the computer {alice, apple23}, the computer can compute F(apple23) and compare the result with XD45DTY. The UNIX operating system was among the first to implement such a system in the 1970's. However, this approach, while addressing the problems due to the storage of the password on the computer, does not address the problem of the password traveling in the clear.

Multifactor Authentication

Multiple factor authentication also exists as a potential solution to the problems inherent with single factor authentication. In multiple factor authentication, at least knowledge of, if not actual possession of, two or more factors must be shown for authentication to be complete. It should be understood that in multiple factor authentication, each factor remains separate. That is, the factors are not combined. Further, the factors are not even concatenated. Several multiple factor authentication techniques exist, including one time password token techniques, encrypted storage techniques, smart card techniques, and split key techniques.

In one time password token techniques, two passwords are utilized, one being a permanent password associated with the user, and the other being a temporary, one-time use, password generated by a password generator. The permanent password may be optional. The temporary password has a finite usable life, such as sixty seconds. At the end of the useable life, another temporary password is generated. An authentication server knows each usable password as well as its useable life, based upon algorithms well known to those of ordinary skill in the art. A user transmits both the permanent password (first factor) and a temporary password (second factor) to the authentication server which then verifies both passwords. The passwords are transmitted in the clear, thus token techniques are subject to man-in-the-middle attacks.

Storage of Crypto-Keys

Using encrypted storage techniques, a cryptographic key is stored on either removable media or a hard drive. The cryptographic key is encrypted with a user's password. After decryption with the user's password, the key is then stored, at least temporarily, in memory of the user's computer system where it is used to either encrypt or decrypt information. As will be recognized by those of ordinary skill in the art, this particular approach is undesirable due to it being susceptible to a dictionary attack, to be discussed in detail further below.

In smart card techniques, a private portion of an asymmetric cryptographic key is stored on a smart card, which is portable. A specialized reader attached to a computer system is used to access the smart card. More particularly, the user enters a PIN (the first factor) to 'unlock' the smart card. Once unlocked, the smart card encrypts or decrypts information using the key stored thereon. It should be stressed that in smart card techniques the key never leaves the smart card, unlike in the encrypted storage techniques discussed above. Rather, electronics within the smart card itself perform the encrypting and/or decrypting. Smart card techniques are associated with certain problems. These problems include the fact that the technique is costly to implement, due to hardware costs. Further, a lack of readers makes use of a user's smart card difficult, and smart cards themselves are subject to loss.

Symmetric and Asymmetric Cryptography

Before discussing in detail the more sophisticated conventional techniques for authentication, which are based upon split key technology, let us briefly describe symmetric and asymmetric key cryptography.

In symmetric key cryptography, the two parties who want to communicate in private share a common secret key, say K. The sender encrypts a message with K, to generate a cipher, i.e. C=Encrypt(M,K). The receiver decrypts the cipher to retrieve the message, i.e. M=Decrypt(C,K). An attacker who does not know K, and sees C, cannot successfully decrypt the message M, if the underlying algorithms are strong. Examples of such systems are DES3 and RC4. Encryption and decryption with symmetric keys provide a confidentiality, or privacy service.

Symmetric keys can also be used to provide integrity and authentication of messages in a network. Integrity and authentication means that the receiver knows who sent a message and that the message has not been modified so it is received as it was sent. Integrity and authentication is achieved by attaching a Message Authentication Code (MAC) to a message M. E.g., the sender computes S=MAC(M,K) and attaches S to the message M. When the message M reaches the destination, the receiver also computes S'=MAC(M,K) and compares S' with the transmitted value S. If S'=S the verification is successful, otherwise verification fails and the message should be rejected. Early MACs were based on symmetric encryption algorithms such as DES, whereas more recently MACs are constructed from message digest functions, or "hash" functions, such as MD5 and SHA-1. The current Internet standard for this purpose is known as hash-based MAC (HMAC).

By combining confidentiality with integrity and authentication, it is possible to achieve both services with symmetric key cryptography. It is generally accepted that different keys should be used for these two services and different keys should be used in different directions between the same two entities for the same service. Thus if Alice encrypts messages to Bob with a shared key K, Bob should use a different shared key K' to encrypt messages from Bob to Alice. Likewise Alice should use yet another key K" for MACs from Alice to Bob and Bob should use K'" for MACs from Bob to Alice. Since this is well understood by those skilled in the art, we will follow the usual custom of talking about a single shared symmetric key between Alice and Bob, with the understanding that strong security requires the use of four different keys.

Symmetric key systems have always suffered from a major problem—namely how to perform key distribution. How do Bob and Alice agree on K?

Asymmetric key cryptography was developed to solve this problem. Here every user is associated with a private/public key pair, commonly referred to as D and E, which are related by special mathematical properties. These properties result in the following functionality: a message encrypted with one of the two keys can then only be decrypted with the other.

One of these keys for each user is made public and the other is kept private. Let us denote the former by E, and the latter by D. So Alice knows $D_{alice}$, and everyone knows $E_{alice}$. To send Alice the symmetric key K, Bob simply sends ciphertext C=Encrypt(K,$E_{alice}$). Alice, and only Alice (since no one else knows $D_{alice}$), can decrypt the ciphertext C to recover the message, i.e. Decrypt(C,$D_{alice}$)=K. Now both Alice and Bob know K and can use it for encrypting subsequent messages using a symmetric key system. Why not simply encrypt the message itself with the asymmetric system? This is simply because in practice all known asymmetric systems are fairly inefficient, and while they are perfectly useful for encrypting short strings such as K, they are inefficient for large messages.

The above illustrates how asymmetric cryptography can solve the key distribution problem. Asymmetric cryptography can also be used to solve another important problem, that of digital signatures. To sign a message M, Alice encrypts it with her own private key to create S=Encrypt(M,$D_{alice}$). She can then send (M,S) to the recipient who can then decrypt S with Alice's public key to generate M', i.e. M'=Decrypt(S, $E_{alice}$). If M'=M then the recipient has a valid signature as only someone who has $D_{alice}$, by definition only Alice, can generate S, which can be decrypted with $E_{alice}$ to produce M. To convey the meaning of these cryptographic operations more clearly they are often written as S=Sign(M,$D_{alice}$) and M'=Verify(S,$E_{alice}$). It is worth noting that asymmetric key digital signatures provide non-repudiation in addition to the integrity and authentication achieved by symmetric key MACs. With MACs the verifier can compute the MAC for any message M of his choice, since the computation is based on a shared secret key. With digital signatures this is not possible since only the sender has knowledge of the sender's private key required to compute the signature. The verifier can only verify the signature, but not generate it. It will be recognized by those skilled in this art that there are numerous variations and elaborations of these basic cryptographic operations of symmetric key encryption, symmetric key MAC, asymmetric key encryption and asymmetric key signatures.

The RSA cryptosystem is one system that implements asymmetric cryptography as described above. In particular the RSA cryptosystem allows the same private-public key pair to be used for encryption and for digital signatures. It should be noted that there are other asymmetric cryptosystems that implement encryption only e.g., ElGamal, or digital signature only, e.g., DSA. Technically the public key in RSA is a pair of numbers E, N and the private key is the pair of numbers D, N. When N is not relevant to the discussion, it is commonplace to refer to the public key as E and the private key as D.

Finally, the above description does not answer the important question of how Bob gets Alice's public key $E_{alice}$. The process for getting and storing the binding [Alice, $E_{alice}$] which binds $E_{alice}$ to Alice is tricky. The most practical method appears to be to have the binding signed by a common trusted authority. So such a "certificate authority" (CA) can create $CERT_{alice}$=Sign([Alice, $E_{alice}$], Dca). Now $CERT_{alice}$ can be verified by anyone who knows the CA's public key Eca. So in essence, instead of everyone having to know everyone else's public key, everyone only need know a single public key, that of the CA. More elaborate schemes with multiple Certificate Authorities, sometimes having a hierarchical relationship, have also been proposed.

Asymmetric key cryptosystems have been around for a long time, but have found limited use. The primary reasons are twofold: (a) the private key D in most systems is long, which means that users cannot remember them, and they have to either be stored on every computer they use, or carried around on smart cards or other media; and (b) the infrastructure for ensuring a certificate is valid, which is critical, is cumbersome to build, operate, and use. The first technique proposed to validate certificates was to send every recipient a list of all certificates that had been revoked. This clearly does not scale well to an environment with millions of users. A later technique proposed to validate certificates was to require that one inquire about the validity of a certificate on-line, which has its own associated problems.

Split Private Key Asymmetric Cryptography

A system based on split private key asymmetric cryptography has been developed to solve these two issues, i.e. long private keys and certificate validity, among others. In this system the private key for Alice, i.e. $D_{alice}$, is further split into two parts, a part $D_{aa}$ which Alice knows, and a part $D_{as}$ which is stored at a security server, where $D_{aa} * D_{as} = D_{alice}$ mod $\Phi(N)$. To sign a message, Alice could perform a partial encryption to generate a partial signature, i.e. PS=Sign(M, $D_{aa}$). Alice then sends the server PS which 'completes' the signature by performing S=Sign(PS,$D_{as}$). This completed signature S is indistinguishable from one generated by the original private key, i.e. $D_{alice}$, so the rest of the process works as previously described. However, $D_{aa}$ can be made short, which allows the user to remember it as a password, so this system is user friendly. Further, if the server is informed that a particular ID has been suspended or revoked, then it will cease to perform its part of the operation for that user, and consequently no further signatures can ever be performed. This provides for instant revocation in a simple, highly effective fashion. It will be recognized by those skilled in the art that a split private key can be used in a similar manner for decryption purposes, and that the partial signatures (or encryptions) may be performed in the reverse sequence, that is first by the security server and subsequently by the user's computer, or may even be performed concurrently in both places and then combined.

Password Based Cryptography

Let us return now to password based systems. Challenge-response systems solve the issue of having to send passwords in the clear across a network. If the computer and Alice share a secret password, P, then the computer can send her a new random challenge, R, at the time of login. Alice computes C=Encrypt(R,P) and sends back C. The computer decrypts Decrypt(C,P)=C'. If C=C', then the computer can trust that it is Alice at the other end. Note however that the computer had to store P.

A more elegant solution can be created using asymmetric cryptography. Now Alice has a private key $D_{alice}$, or in a split private key system she has $D_{aa}$. The computer challenges her to sign a new random challenge R. She signs the challenge, or in the split private key system she interacts with the security server to create the signature, and sends it back to the computer which uses her public key, retrieved from a certificate, to verify the signature. Observe that the computer does not have to know her private key, and that an eavesdropper observing the signature on R gains no knowledge of her private key.

The SSL system, which is widely used on the Internet, in effect implements a more elaborate method of exactly this protocol. SSL has two components, 'server side SSL' in which a server proves its identity by correctly decrypting a particular message during connection set-up. As browsers such as Netscape and Microsoft Internet Explorer come loaded with the public keys of various CAs, the browser can verify the certificate of the server and use the public key therein for encryption This authenticates the server to the client, and also allows for the set-up of a session key K, which is used to encrypt and MAC all further communications. Server side SSL is widely used, as the complexity of managing certificates rests with system administrators of web sites who have the technical knowledge to perform this function. The converse function in SSL, client side SSL, which lets a client authenticate herself to a server by means of a digital signature is rarely used, because although the technical mechanism is much the same, it now requires users to manage certificates and long private keys which has proven to be difficult, unless they use the split private key system. So in practice, most Internet web sites use server side SSL to authenticate themselves to the client, and to obtain a secure channel, and from then on use Userid, Password pairs to authenticate the client.

So far from disappearing, the use of passwords has increased dramatically. Passwords themselves are often dubbed as inherently "weak". This is inaccurate because, if they are used carefully, passwords can actually achieve "strong" security. As discussed above, passwords should not be sent over networks, and if possible should not be stored on the receiving computer. Instead, in a "strong" system, the user can be asked to prove knowledge of the password without actually revealing the password. Perhaps most critical is that passwords should not be vulnerable to dictionary attacks.

Dictionary Attacks

Dictionary attacks can be classified into three types. In all three types the starting point is a 'dictionary' of likely passwords. Unless the system incorporates checks to prevent it, users tend to pick poor passwords, and compilations of lists of commonly used poor passwords are widely available.

On line dictionary attack: Here the attacker types in a guess at the password from the dictionary. If the attacker is granted access to the computer they know the guess was correct. These attacks are normally prevented by locking the user account if there are an excessive number of wrong tries to gain access. Note that this very commonly used defense prevented one problem, but just created another one. An attacker can systematically go through and lock out the accounts of hundreds or thousands of users. Although the attacker did not gain access, now legitimate users cannot access their own accounts either, creating a denial of service problem.

Encrypt dictionary attacks: If somewhere in the operation of the system a ciphertext C=Encrypt(M,P) was created, and the attacker has access to both C and M, then the attacker can compute off-line C1=Encrypt(M,G1), C2=Encrypt(M,G2), . . . where G1, G2, . . . etc. are the guesses at the password P from the dictionary. The attacker stops when he finds a Cn=C, and knows that Gn=P. Observe that the UNIX file system, which uses a one way function F( ) instead of an encryption function E( ), is vulnerable to this attack.

Decrypt dictionary attacks: Here the attacker, does not know M, and only sees the ciphertext C (where C=Encrypt (M,P)). The system is only vulnerable to this attack if it is true that M has some predictable structure. So the attacker tries M1=Decrypt(C,G1), M2=Decrypt(C,G2) . . . , and stops when the Mi has the structure he is looking for. For instance Mi could be known to be a timestamp, English text, or a number with special properties such as a prime, or a composite number with no small factors. Those with ordinary skill in the art will recognize there are numerous variations of the encrypt and decrypt dictionary attacks.

In split private key systems, the user portion of the private key, referred to as $D_{aa}$ above, may come from the user's password only. Thus, a compromise of the password, i.e, another person learning a user's password, results in a compromise of the split private key system. Also, there still remains the possibility of a dictionary attack on the server portion of the private key, referred to as $D_{as}$ above, because the user portion of the private key comes from the user's password only. Thus knowledge of $D_{as}$ enables a dictionary attack on $D_{aa}$. As discussed above, many of the existing multiple factor systems that address these problems rely upon expensive hardware. Because of this and other reasons, such systems have failed to gain widespread support. However, as will be discussed further below, recently a multifactor cryptographic system was developed which overcomes these problems.

Multifactor Split Private Key Asymmetric Cryptography

In particular, as disclosed in U.S. application Ser. No. 11/055,987, filed Feb. 14, 2005, and entitled "Architecture For Asymmetric Crypto-key Storage", to overcome these problems Tricipher, Inc, the assignee of all rights in the present application, has developed an asymmetric cryptosystem in which users are associated with an asymmetric crypto-key having a public key and a private key split into multiple private key portions. As in the conventional split key asymmetric cryptosystems discussed above, each of the private key portions can be applied to an original message separately or in sequence and the partial results combined to form a transformed, i.e. encrypted, message, and the public key can be applied to the transformed message to verify authenticity of the message preferably by recovering the original message, which authenticates the user. Conversely a message transformed, i.e. encrypted, with the public key can be decrypted by applying each of the private key portions to the transformed message separately or in sequence and the partial results combined to decrypt the original message.

However, unlike the conventional split key asymmetric cryptosystem discussed above, the Tricipher system generates at least one of the multiple private key portions of the asymmetric crypto-key using multiple pieces of information, known as factors. For purposes of the following discussion, we will assume that a first private key portion of the asymmetric crypto-key is generated using multiple factors. The multiple factors could be two factors, three factors, or any number of multiple factors, as may be desired under the circumstances. In any event, each of the multiple factors is under the control of a single entity. That is, the single entity has possession of, or free access to, each of the multiple factors. For purposes of the following discussion, we will assume that the entity associated with the first private key portion is a user. Thus, the first private key portion could be $D_{aa}$.

A factor could be as simple as a readily available number string, such as a serial number of a user's computer, or could be a sophisticated algorithm, such as a cryptographic key. Preferably, one of the factors corresponds to the user's password. If each of the multiple factors is a number string, generation of the first private key portion could be accomplished by simply concatenating the multiple factors. However, advantageously, the first private key portion is generated by cryptographically combining the multiple factors, and each of the multiple factors is, or is used to produce, a cryptographic key. Thus, cryptographic keys are beneficially used to produce a cryptographic key.

The first private key portion is not stored in a persistent state. That is, the first private key portion must be generated whenever its use is desired. The first private key portion may be immediately destroyed after its initial use, or may be stored temporarily after its generation, making it available for use multiple times before it is destroyed, for example for use during a predetermined time period or for use a predetermined number of times.

Another of the multiple private key portions of the asymmetric crypto-key, which will be referred to as the second private key portion for purposes of this discussion, is under control of another entity, in this case an entity other than the applicable user, e.g. a secure server or another user. Thus, the second private key portion could be $D_{as}$. This second private key portion may be stored in a persistent state. In this example, it is assumed that the first and second private key portions of the asymmetric crypto-key are combinable to form a complete private key $D_{alice}$. This private key is usable to transform, e.g. encrypt or decrypt, messages as may be desired under the circumstances.

Thus, in the multifactor split private key asymmetric cryptosystem developed by Tricipher, Inc, one of multiple private key portions of an asymmetric crypto-key, e.g. the user's private key portion, is generated using multiple factors, with each of these factors being under the control of the applicable entity, e.g. that user. This results in a private key that provides greater security than the private keys in other split private key asymmetric cryptosystems in which each entity's, e.g. each user's, private key portion is generated using only a single factor.

Additionally, in the multifactor split private key asymmetric cryptosystem developed by Tricipher, Inc, preferably some, but not all, of the multiple factors used to generate the user's private key portion may be stored, with each stored in a in different location. For example, if one of the factors corresponds to the user's password, preferably neither the user's password nor the corresponding factor is stored, except temporarily on random access memory (RAM) for only the time necessary, in the case of the password, to allow for generation of the corresponding factor after the user enters the password and, in the case of the corresponding factor, to allow for generation of the first private key portion after the corresponding factor has been generated. On the other hand, the other of the multiple factors may be stored. Thus, if there are two other factors, these later two factors are preferably stored separately at different locations. This adds a level of security, in that a thief would have to infiltrate two locations to steal both of these factors.

In this regard, one of these later factors may be stored on either a user's computing device or removable media configured to communicate with the user's computing device. As will be recognized by those skilled in the art, the user's computing device could be a personal computer (PC), personal computing device, mobile phone or some other type computing device, and the removable media could be a USB flash drive, smart card, floppy disk, compact disk (CD) or some other type of portable data storage device. A factor stored on a user's computing device is sometime referred to as $D_{tether}$ and a factor stored on removable media is sometime referred to as $D_{USB}$.

The first private key portion is temporarily stored after being generated. During this temporary storage, it is usable to prove the user's identity multiple times without the user providing any authentication information. This temporary storage could be limited to a predefined time period, or a predefined number of authentications.

The public key, commonly designated as E, is preferably stored under control of an entity other than the entity having access to the multiple factors, e.g. other than the applicable user in the above example. Thus, the public key is available to at least one other entity.

In the multifactor split private key asymmetric cryptosystem developed by Tricipher, Inc., another of the private key portions of the split private key may also be generated based on the same or other multiple factors, which could be partially or completely under the control of the same or another entity, e.g. could be under the control of the applicable user or another entity in the example above. In any event, this other private key portion could be generated based on multiple factors in same manner as described above for the first private key portion.

As described in the above referenced application, in the multifactor split private key asymmetric cryptosystem developed by Tricipher, Inc., the factor $D_{tether}$ is preferably the private key of a private-public asymmetric key pair, including $D_{tether}$ and $E_{tether}$, and having a modulus $N_{tether}$. The factor $D_{USB}$ is preferably the private key of a private-public asymmetric key pair, including $D_{USB}$ and $E_{USB}$, and having a modulus $N_{USB}$. For example, $D_{tether}$ and $E_{tether}$ and/or $D_{USB}$ and $E_{USB}$ may form a conventional RSA private-public asymmetric key pair.

The non-private parts of the generated keys, i.e., $E_{tether}$, $N_{tether}$, $E_{USB}$, and $N_{USB}$, are stored, for example, at a trusted server. In the most common implementation, $D_{tether}$ is stored securely on the hard disk of a user's PC using the protection capabilities provided by the PC's operating system, preferably as a non-exportable private key in a Windows Operating System key-store. Of course, as desired, $D_{tether}$ could be stored in a Windows Operating System registry. Alternatively, $D_{tether}$ can be, as desired, stored on the trusted processing module (TPM). No matter where or how on the user's computing device $D_{tether}$ is stored, in the most basic configuration, $D_{tether}$ can only be used from the user's computing device upon which it is stored. That is, $D_{tether}$ is a non-exportable private key stored on the user device upon which it will be used. However, the multifactor split private key asymmetric cryptosystem developed by Tricipher, Inc. also facilitates porting $D_{tether}$ to other devices for use thereon.

$D_{USB}$, which is stored on removable media, also needs to be protected, since storing any kind of key in the clear should be avoided if possible. In the case of $D_{USB}$ this is particularly important because if $D_{USB}$ is stored on the removable media in clear and should the user misplace or otherwise lose the removable media, an attacker could easily access, extract and/or copy $D_{USB}$ from the removable media, and potentially use $D_{USB}$ to impersonate the user. Thus, in the multifactor split private key asymmetric cryptosystem developed by Tricipher Inc., $D_{USB}$ is beneficially stored on the removable media in an encrypted state.

Preferably, encryption of $D_{USB}$ is not performed with the user's password, because this would still leave $D_{USB}$ vulnerable to dictionary attacks and guessing attacks. If the factors include both $D_{tether}$ and $D_{USB}$, $D_{USB}$ may, as disclosed in the above referenced application, be encrypted using $D_{tether}$, which is stored, for example, on the user's PC.

However, if $D_{USB}$ is encrypted using $D_{tether}$, an attacker with access to the removable media, as well as the user's PC or other computing device storing $D_{tether}$ and the user's password could obtain $D_{tether}$ from the user's computing device, decrypt $D_{USB}$ by applying $D_{tether}$, and then use the user's password, $D_{USB}$ and $D_{tether}$ to generate the first private key portion, e.g. $D_{aa}$. Having the first private key portion, the attacker would now be in a position to impersonate the user. Furthermore, in cases where the factors include $D_{USB}$, but not $D_{tether}$ there is no tethering key to encrypt $D_{USB}$.

As will be discussed further below, recently a multifactor cryptographic system was developed which overcomes these problems.

Rolling Key Security for Multifactor Split Private Key Asymmetric Cryptograhy

In particular, as disclosed in concurrently filed U.S. application Ser. No. 11/332,204, filed Jan. 17, 2006, and entitled "Multifactor Split Asymmetric Crypto-Key With Rolling Key Security", Tricipher, Inc., which is also the assignee of all rights in the present application, has developed a technique for enhancing security of a stored factor which will be used to generate a portion of a private key of a split private key asymmetric cryptosystem.

In accordance with the technique described in the above referenced application, a factor, such as the above described $D_{USB}$, is first stored, for example on a user's USB flash memory device, after being encrypted with the private rolling key, sometimes referred to as $D_R$, or public rolling key, sometimes referred to as $E_R$, of a generated RSA or other type first asymmetric rolling crypto-key. The one first rolling key, e.g. $D_R$, used for the encryption is also stored with the encrypted factor. The other first rolling key, e.g. $E_R$, which has not been used to encrypt the factor, is stored elsewhere for access by another entity. For example, the other rolling key might be stored on a sponsor's network server.

In one described implementation, when the user desires to login, the encrypted factor, e.g., $D_{USB}$, and the one first rolling key, e.g. $D_R$, stored with the encrypted factor are retrieved from storage. Proof of knowledge of the retrieved first rolling key, e.g. $D_R$, and a request for the other first rolling key, e.g. $E_R$, are transmitted via a network, such as the Internet, by the user to the other entity. The other entity can authenticate the user based on the transmitted proof of knowledge of the one first rolling key, e.g. $D_R$, and the other first rolling key, e.g. $E_R$, which had been previously stored for access by the other entity. If the user is authenticated, the other first rolling key, e.g. $E_R$, is transmitted via the network by the other entity to the user in response to the transmitted request. The user can decrypt the retrieved encrypted factor, e.g., $D_{USB}$, with the received other first rolling key, e.g. $E_R$, and use the decrypted factor to generate the applicable private key portion of the user's asymmetric crypto-key. The user can then complete the login with the decrypted factor, e.g., $D_{USB}$.

After this log in, and in preparation for a later login by the user, the factor is again encrypted, but this time with a different rolling key. That is, the factor, e.g. $D_{USB}$, is next stored, for example on a user's USB flash memory device, after being encrypted with a different private rolling key, e.g. $D_{R1}$, or public rolling key, e.g. $E_{R1}$, of a generated RSA or other type second asymmetric rolling crypto-key. The second rolling key, e.g. $D_{R1}$, used for the encryption is stored with the encrypted factor. The other second rolling key, e.g. $E_{R2}$, which has not been used to encrypt the factor, is stored elsewhere, e.g. at a sponsor's network server, for access by the other entity.

The next time the user desires to login, the encrypted factor, e.g., $D_{USB}$, and the second rolling key, e.g. $D_{R1}$, stored with the encrypted factor are retrieved from storage. The proof of knowledge of the retrieved second rolling key, e.g. $D_{R1}$, and a request for the other second rolling key, e.g. $E_{R1}$, are transmitted via a network, such as the Internet, by the user to the other entity. The other entity can authenticate the user based on the transmitted proof of knowledge of the one second rolling key, e.g. $D_{R1}$, and the other first rolling key, e.g. $E_{R1}$, which had been previously stored for access by the other entity. If the user is authenticated, the other first rolling key, e.g. $E_{R1}$, is transmitted via the network by the other entity to the user in response to the transmitted request. The user can decrypt the retrieved encrypted factor, e.g., $D_{USB}$, with the received other first rolling key, e.g. $E_{R1}$, and use the decrypted factor to generate the applicable private key portion of the user's asymmetric crypto-key. The user can then complete the login. The same technique is repeated after each login, so that the stored factor is always secured with a new rolling key after each prior login.

While the rolling key technique described in the above referenced application significantly enhances security of a stored factor needed to created a split private key, or for that matter a stored factor needed to create any crypto-key, it does not enhance security of the applicable private key portion of the user's asymmetric crypto-key after it has been generated.

In this regard, if the applicable generated private key portion, e.g. $D_{U1}$, of the user's asymmetric crypto-key is allowed to be used only once after it has been generated, and is then be destroyed, it will only be available to an attacker for a very limited period of time. While this would result in the applicable generated private key portion, e.g. $D_{U1}$, being relatively secure, it would not be very convenient for the user. That is, under such a protocol, the user would be required to regenerate the applicable private key portion, which may require reentry of the user's password, again and again and again. For example, to obtain access to different information at the same Web site during the same session, could require that the user reenter the user's password and regenerate the applicable private key portion, e.g. $D_{U1}$, from the applicable factor(s) 2, 3, 4, or even more times. Similarly, to obtain access to information at different network sites during the same session, could require that the user reenter the user's password and regenerate the applicable private key portion, e.g. $D_{U1}$, from the applicable factor(s) to access each different network site.

On the other hand, if the applicable generated private key portion, e.g. $D_{U1}$, is allowed to be used repeatedly without requiring the user to reenter the user's password or to regenerate the applicable private key portion, e.g. $D_{U1}$, for each and every successive use, the applicable private key portion, e.g. $D_{U1}$, will be relatively less secure, since it will be available to an attacker for a longer period of time. The reduced security can potentially be mitigated to some extent by protecting the generated private key portion, e.g. $D_{U1}$, while it is stored on, for example, RAM, during its period of use. In this regard, the stored private key portion, e.g. $D_{U1}$, can be encrypted to make it more difficult for an attacker to gain knowledge of the private key portion in a usable form during the period of use.

However, even if the private key portion, e.g. $D_{U1}$, is encrypted or protected while it is stored during the period of use, there will always be some period(s) during which the private key portion, e.g. $D_{U1}$, must be available to an attacker in the clear, i.e. in an unprotected state. So there will be a window(s) of opportunity for an attacker to gain access to the applicable private key portion, e.g. $D_{U1}$. While the length of the window(s) will depend on whether or not protection is used and the type of protection that is employed during the period of use, it will be recognized that there will be some period(s), however small in length, when the applicable private key portion, e.g. $D_{U1}$, must be available in the clear and a window(s) of vulnerability to an attack will exist.

Accordingly, a need exists for better techniques for securing the private key portion of the user's asymmetric crypto-key if, after successful login, the user is not require to re-authenticate in order to access different network sites or different information at a network site during a session.

OBJECTIVES OF THE INVENTION

It is an object of the present invention to overcome the deficiencies of existing cryptosystems. Additional objects, advantages, novel features of the present invention will become apparent to those skilled in the art from this disclosure, including the following detailed description, as well as by practice of the invention. While the invention is described below with reference to a preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with the present invention, a system is provided for generating an asymmetric crypto-key, such as an RSA asymmetric crypto-key, which is associated with a user and which has a private and public key pair, with one of the keys in the key pair having multiple different splits.

The system includes a storage device capable of storing a random number generation function having one or more constants. The storage device preferably includes a non-volatile memory for persistently storing the random number generation function, and could, for example, include a hard, compact or floppy disk. Preferably, the stored random number generation function is the PKCS-5 algorithm and the one or more constants include a salt and/or an iteration count.

The processor is configured with the necessary logic, which could for example be implemented on software having executable programmed instructions, so as to be capable of generating a user asymmetric crypto-key having multiple different splits of one key of the private and public key pair. More particularly, the processor generates the asymmetric crypto-key having a private key, which for purposes of this summary will be referred to as D, and a public key, which for purposes of this summary will be referred to as E. Either or both of these keys may be subjected to the multiple different splits. However, for purposes of this summary we will assume that it is the private key D that will be spit.

The processor also computes a first key portion for the split key based on the stored random number generation function and a first value of each of the one or more constants. Since we are assuming, for purposes of this summary, that the private key D is split, we will refer to the computed first key portion as $D_1$. The processor then computes the second key portion, which we will refer to in this summary as $D_2$, based on the computed first key portion $D_1$ and the applicable key of the private key and public key pair, in this case private key D. The computed first key portion $D_1$ and the computed second key portion $D_2$ form a first split of the applicable key, in this example private key D, of the user asymmetric crypto-key.

The processor additionally computes another first key portion for the split key based on the stored random number generation function and a second value of each of the one or more constants. The second value of each applicable constant is different than the first value of that constant. For purposes of this summary, we will refer to the computed other first key portion as $D_1'$. The processor then computes another second key portion, which we will refer to in this summary as $D_2'$, based on the computed other first key portion $D_1'$ and the applicable key of the private key and public key pair, in this case private key D. The computed other first key portion $D_1'$ and the computed other second key portion $D_2'$ form a second split of the applicable key, in this example private key D, of the user asymmetric crypto-key.

If the stored random number generation function includes multiple constants, it may be advantageous to compute the other first key portion $D_1'$ using modified values for each of the constants. For example if the stored random number generation function is the PKCS-5 algorithm, the function will include a salt constant and an iteration count constant. In such a case, the processor preferably computes the first key portion $D_1$ based on the PKCS-5 algorithm, an initial value of the salt and an initial value of the iteration count, and computes the other first key portion $D_1'$ based on the PKCS-5 algorithm, a modified value of the salt and a modified value of the iteration count. That is, preferably both the initial value and the modified value of the salt are different, and the initial value and the modified value of the iteration count are different.

According to an aspect of the invention, the second key portion is computed in accordance with the formula: $D_1 * D_2 = D \mod \Phi(N)$, and the other second key portion is computed in accordance with the formula: $D_1' * D_2' = D \mod \Phi(N)$.

According to another aspect of the invention, the stored random number generation function also has multiple factors, including a first factor and a second factor. That is, the split key, in this example private key D, is a multifactor key. In such a case, the processor is further configured with logic to compute both the first key portion $D_1$ and the other first key portion $D_1'$ based also on the same value of the first factor and the same value of the second factor. Preferably, the first factor corresponds to a password of the user, i.e. the first factor is or is a function of the password, and the second factor corresponds to the private or public key of another asymmetric crypto-key, i.e. the second factor is or is a function of this other private or public key. Beneficially, such a second factor is persistently stored on the storage device or on some other storage device having non-volatile memory. The other storage device could, for example, be a removable storage device, such as a USB flash memory, that is configured to store a value of the second factor, e.g. a value of the private or public key of the other asymmetric crypto-key, and be temporarily interconnected with the processor to facilitate retrieval of the second factor when required.

If for example the PKCS-5 algorithm is utilized, the first key portion $D_1$ can be computed by taking a first Sha-1 hash of the password, where Sha-1 (password) equals a factor $F_p$ corresponding to the password, and transforming this quantity with another factor, which will be referred to in this summary as $D_F$ and corresponds to a private or public key of another asymmetric crypto-key. The result of this transformation is then applied as an input to the PKCS-5 algorithm, along with the salt and the iteration count. Stated another way, $D_1 = $ PKCS-5 (sign {Sha-1 (password), $D_F$}, salt, iteration count). After determining the first key portion $D_1$, the second key portion $D_2$ can be computed, preferably based on the relationship $D_1 * D_2 = D \mod \Phi(N)$, to thereby complete the splitting of D.

The other first key portion $D_1'$ can be computed by taking a first Sha-1 hash of the password, and transforming this quantity with the other factor $D_F$, and then using the result of this transformation as an input to the PKCS-5 algorithm, along with the modified salt and the modified iteration count. Stated another way, $D_1' = $ PKCS-5 (sign {Sha-1 (password), $D_F$}, modified salt, modified iteration count). After determining the other first key portion $D_1'$, the other second key portion $D_2'$ can be computed based on the relationship $D_1' * D_2' = D \mod \Phi(N)$, to thereby complete the splitting of D.

It will be recognized that the multiple factors of the PKCS-5 algorithm might also include a third factor, which will be referred to in this summary as $D_{FF}$. The third factor $D_{FF}$ could, for example, correspond to either a private or public key of still another asymmetric crypto-key. If so, the first key portion $D_1$ can be computed using the formula $D_1 = $ PKCS-5 (sign {Sha-1 (sign {Sha-1 (password), $D_{FF}$}), $D_F$}, salt, iteration count) and the other first key portion $D_1'$ can be computed using the formula $D_1' = $ PKCS-5 (sign {Sha-1 (sign {Sha-1 (password), $D_{FF}$}), $D_F$}, modified salt, modified iteration count).

It is strongly preferred that one factor, e.g. first factor $F_p$, never be persistently stored on the system or, more generally, on any system. That is, one factor is preferably never stored in a non-volatile memory, such a hard disk, compact disk or floppy disk memory. Furthermore, whether or not this one factor corresponds to the password, it is strongly preferred that the password also is never persistently stored on the system or, more generally, on any system. Rather, the first factor is preferably generated independently for each session and, if the factor corresponds to the user password, based on receipt of a user input representing the user password.

As discussed above, the private key D or public key E of a single user crypto-key can be split into multiple different splits, e.g. into one first key portion $D_1$ and second key portion $D_2$ and into another different first key portion $D_1'$ and second key portion $D_2'$. To enhance security the first key portion $D_1$, of the first split of the private key D of the user's asymmetric crypto-key, can be generated and used only once each session for the initial session login, and can then be destroyed. Accordingly, it need only be non-persistently stored on a volatile memory, e.g. a RAM, during the short time required for initial login. Thus, the first key portion $D_1$ will only be available to an attacker for a very limited time period, and as a result is kept relatively secure. The other first key portion $D_1'$, of the second split of the private key D of the user's asymmetric crypto-key, can be generated, and used repeatedly each session after initial login, for logging-in to different sites or to obtain different information during the session, without requiring the user to reenter the user's password, or recreate the other first key portion $D_1'$ for every successive use. Thus, by utilizing the multi-split public or private key for login, the user is not required to reenter the user's password, or recreate a key portion needed for multiple logins, again and again and again in order to obtain access to different information at the same Web site or to information at different network sites during a session, and at the same time is able to limit the time in which the key portion required for initial session login is available to an attacker in the clear, i.e. in an unprotected state.

PREFERRED EMBODIMENT OF THE INVENTION

The Network Architecture

Figure 1:
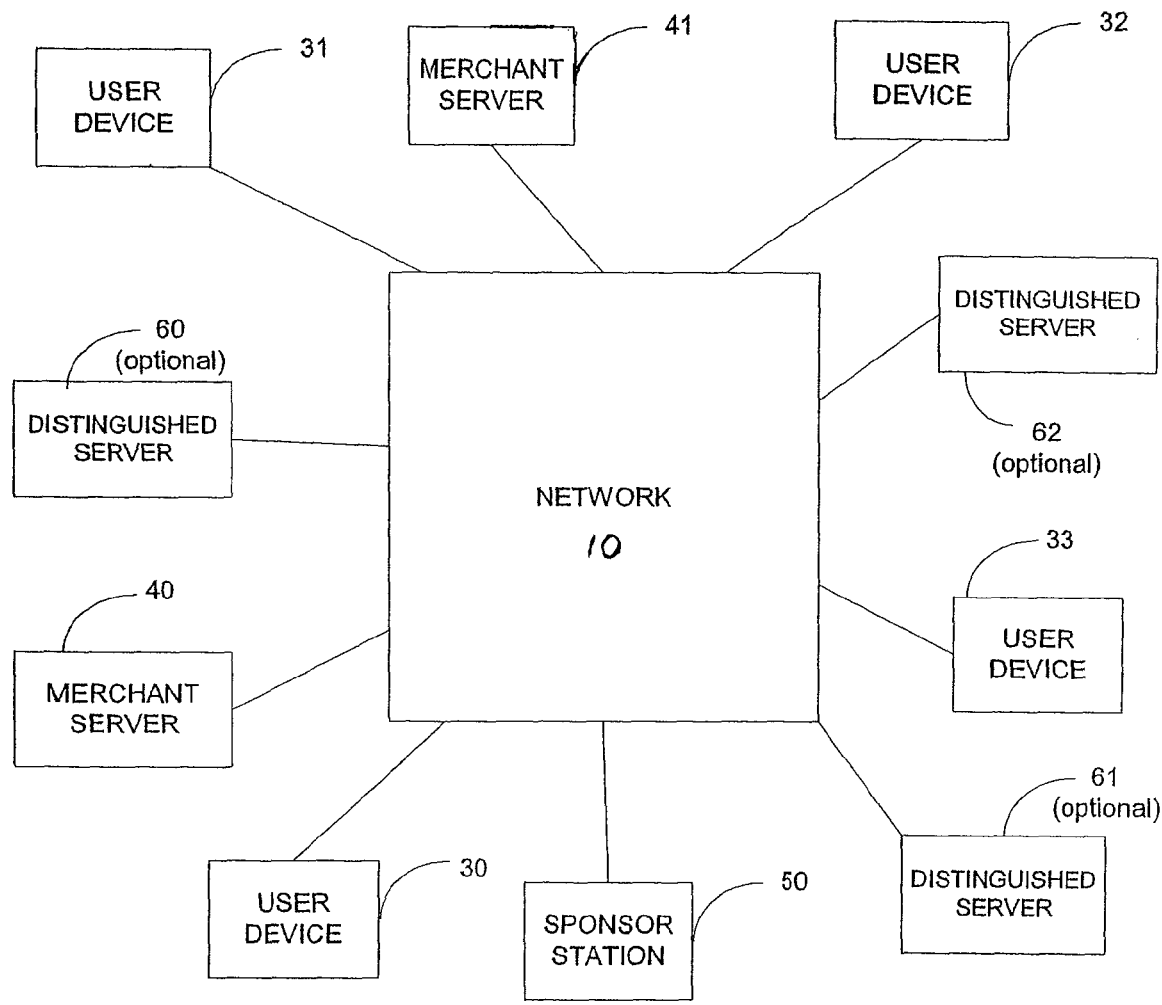
FIG. 1 depicts an exemplary network, including networked devices associated with users, a sponsor, merchants, and an optional distinguished entities, in accordance with the present invention.

FIG. 1 illustrates a network 10, which could be the Internet or another public or private network. As shown, the network 10 includes multiple network devices interconnected so as to be capable of communicating with each other. These network devices include network devices 30-33 associated with individual users, network devices 40-41 associated with merchants, a network device 50 associated with a sponsor, and optional network devices 60-62 associated with entities known to and trusted by the sponsor. These later entities are sometimes referred to as distinguished entities.

User network devices 30-33 are typically personal computers, but could be other types network devices. Merchant network devices 40-41 could be associated with any type entity having a presence, e.g. a web page, on network 10, and typically take the form of network, e.g. Internet, servers. Accordingly, the merchant network devices 40-41 will sometimes be referred to as merchant servers. The sponsor network device 50 also typically takes the form of a network server, and will sometimes be referred to as a sponsor server or sponsor station. Likewise, the optional distinguished entity network devices 60-62 typically take the form of network servers. Accordingly, the optional distinguished entity network devices 60-62 will sometimes be referred to as distinguished servers. It will be understood that a network may consist of more network devices than depicted in FIG. 1.

The User Network Device

Figure 2:
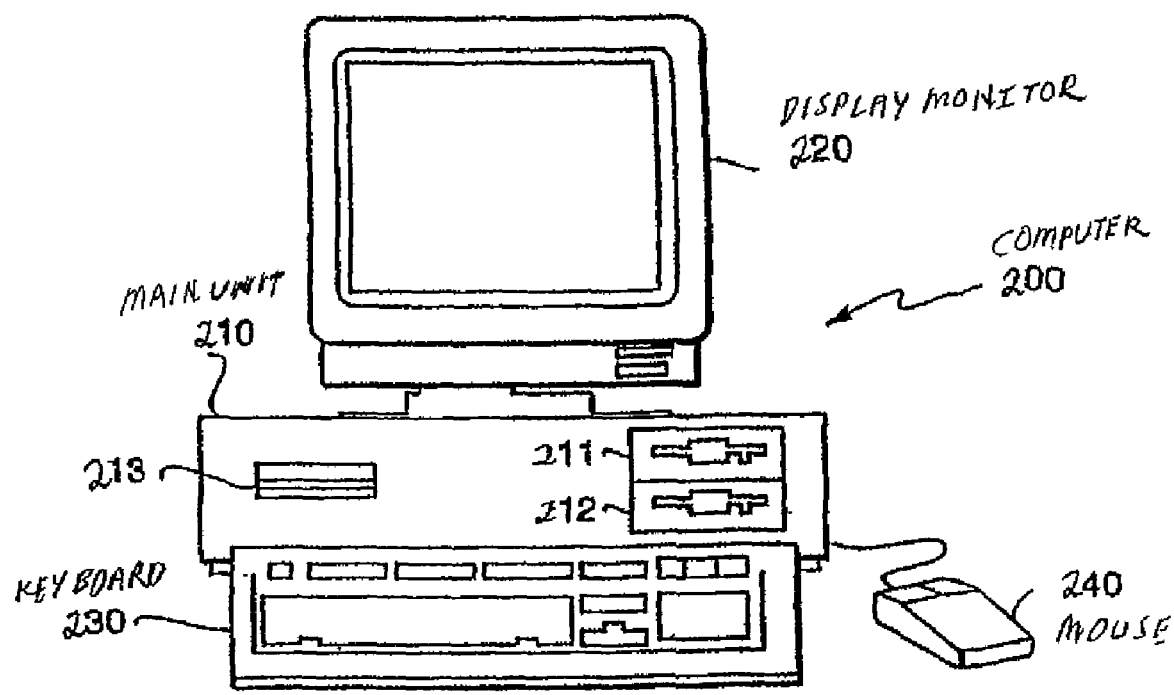
FIG. 2 depicts a computer suitable for use by a user to access a network, in accordance with the invention.
Figure 3:
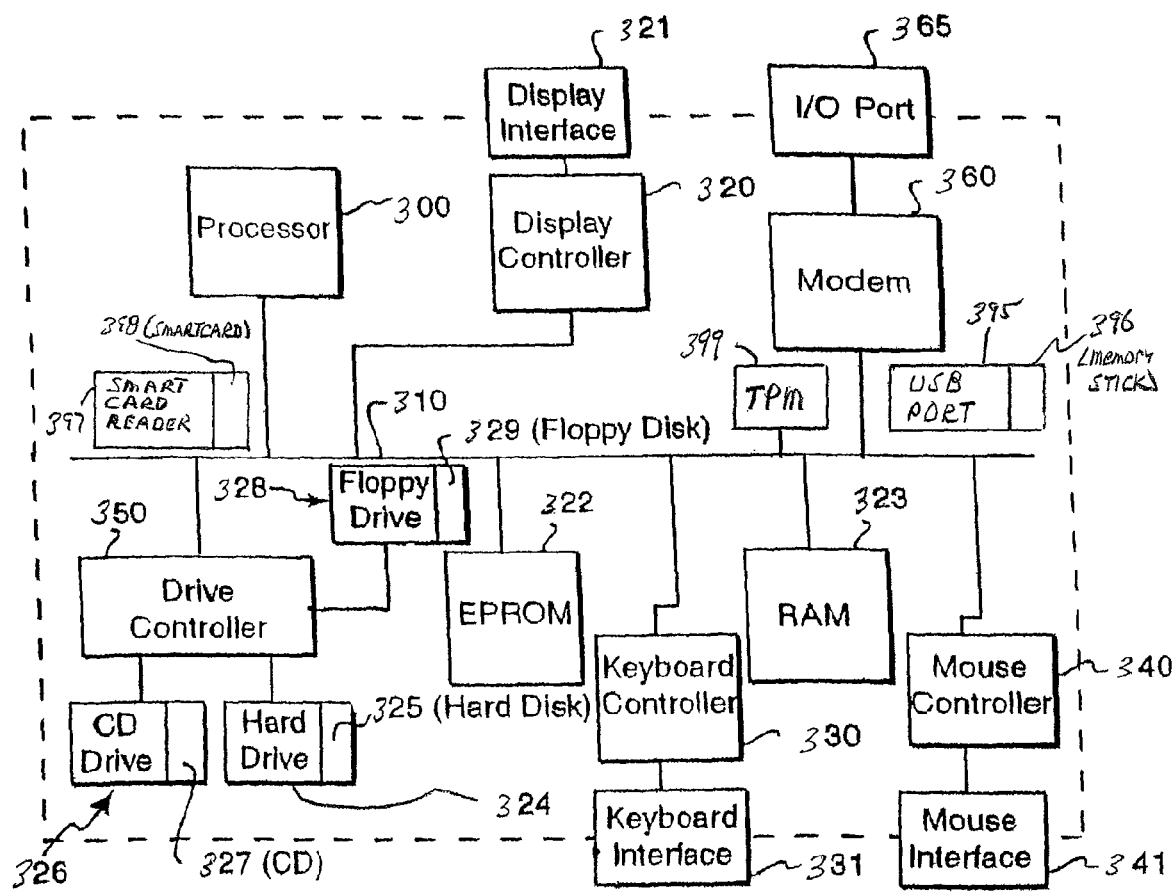
FIG. 3 is an exemplary block diagram of components of the computer depicted in FIG. 2.

FIGS. 2 and 3 depict an exemplary personal computer (PC) suitable for use by an individual user as a user network device 30-33 to access the network 10. The PC is preferably a commercially available personal computer. It will be recognized that the PC configuration is exemplary, and that other components (not shown) could be added or substituted for those depicted and certain of the depicted components could be eliminated if desired. Further, a user device 30-33 could be another type device, i.e. a device other than a computer, such as, but not limited to, a personal digital assistant (PDA) or a mobile phone, e.g. cellular or other type wireless communications device.

The PC or other type user network device functions in accordance with stored programmed instructions, which are sometimes characterized as logic, that are executed, drive its operation. Preferably, the computer stores its programmed instructions on an EPROM, or hard disk. It will be recognized that only routine programming is required to implement the instructions required to drive the computer to operate in accordance with the invention. Further, since the computer components and configuration are well understood by those skilled in the art, routine operations performed by depicted components will generally not be described, such operations also being well understood in the art.

Referring to FIG. 2, the computer 200 includes a main unit 210 with slots 211, 212, and 213, respectively provided for loading programming or data from a floppy disk, compact disk (CD), or other removable media, onto the computer 200. The computer 200 also includes a keyboard 230 and mouse 240, which serve as user input devices. A display monitor 220 is also provided to visually communicate, i.e. display, information to the user.

As depicted in FIG. 3, the computer 200 has a main processor 300 which is interconnected via bus 310 with various remote or local storage devices which may include, but are not limited to, erasable programmable read only memory (EPROM) 322, read only memory (RAM) 323, hard drive 324, which has an associated hard disk 325, CD drive 326, which has an associated CD 327, floppy drive 328, which has an associated floppy disk 329, USB port 395 for connecting a universal serial bus (USB) drive 396 (often called a flash drive or memory), and smart card reader 397 for communicating with a smart card 398. Also shown in FIG. 3 is a trusted processing module (TPM) 399 for securely storing cryptographic keys. Taken together, the remote and local storage devices will be referred to collectively as storage devices 370.

A drive controller 350 controls the hard drive 324, CD drive 326 and floppy drive 328. Also depicted in FIG. 3 is a display controller 320 interconnected to display interface 321, a keyboard controller 330 interconnected to keyboard interface 331, a mouse controller 340 interconnected to mouse interface 341 and a modem 360 interconnected to I/O port 365, all of which are connected to the bus 310. The modem 360 and interconnected I/O port 365, serve as a network interface, and are used to transmit and receive signals via the network 10 as described herein. Those skilled in the art will recognize that another type of network interface could be easily substituted for that shown. It should also be understood that, if desired, other components could be connected to the bus 310, or that less than all the components shown in FIG. 3 could be connected to the bus 310. By accessing and executing the stored computer programming, i.e. the stored programmed instructions, the processor 300 is driven to operate in accordance with the present invention.

The Sponsor, Merchant and/or Distinguished Entity Network Device

As noted above, the sponsor network device 50, each merchant network device 40-41 and each optional distinguished network device 60-62 is typically represented on network 10 by a network server. However, here again, any network compatible device which is capable of functioning in the described manner could be utilized in lieu of a server to represent the associated entity, i.e. the sponsor, each merchant and/or each optional distinguished entity, on the network.

Figure 4:
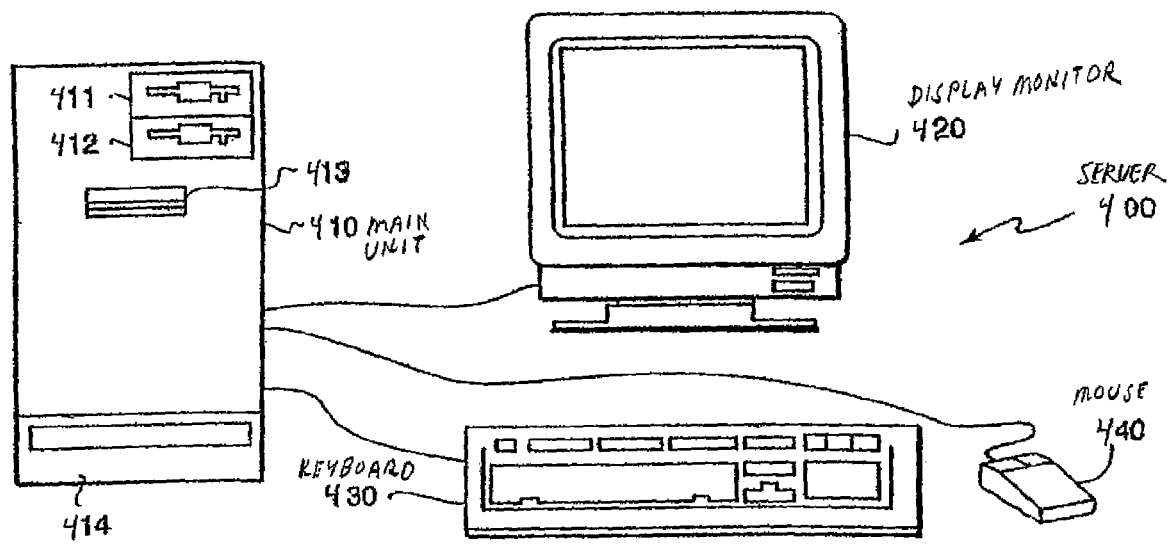
FIG. 4 depicts a server suitable for use by a sponsor, a merchant, and/or an optional distinguished entity, in accordance with the present invention.
Figure 5:
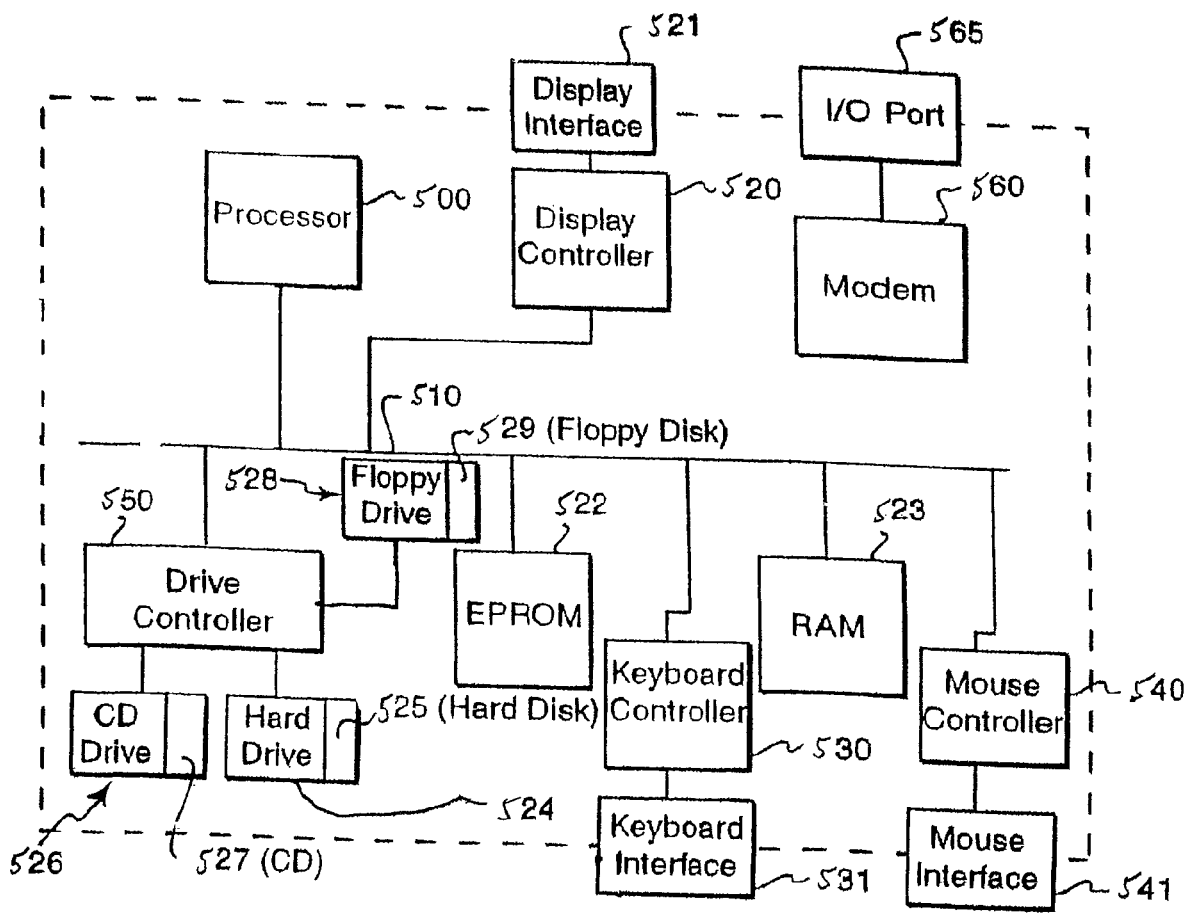
FIG. 5 is an exemplary block diagram of components of the server depicted in FIG. 4.

FIGS. 4 and 5 depict an exemplary network server suitable for use by the sponsor, merchants, and optional distinguished entities to access the network 10 in accordance with the invention. The server is preferably a commercially available, high power mini-computer or mainframe computer. Here again, it will be recognized that the server configuration is exemplary, and that other components (not shown) could be added or substituted for those depicted and certain of the depicted components could be eliminated if desired.

The server functions as described below in accordance with stored programmed instructions, i.e. logic, which drive its operation. Preferably, the server stores its unique programmed instructions on an EPROM or hard disk. It will be recognized that only routine programming is required to implement the instructions required to drive the server to operate in accordance with the invention. Further, since the server components and configuration are well understood to those skilled in the art, routine operations performed by depicted components will generally not be described, such operations also being well understood in the art.

Referring to FIG. 4, the server 400 includes a main unit 410 with slots 411, 412, 413 and 414, respectively provided for loading programming or data from a floppy disk, CD and/or hard disk onto the server 400. The server 400 also includes a keyboard 430 and mouse 440, which serve as user input devices. A display monitor 420 is also provided to visually communicate, i.e. display, information to the applicable entity.

As depicted in FIG. 5, the server 400 has a main processor 500 which is interconnected via bus 510 with various storage devices including EPROM 522, RAM 523, hard drive 524, which has an associated hard disk 525, CD drive 526, which has an associated CD 527, and floppy drive 528, which has an associated floppy disk 529. The memories, disks and CD all serve as storage media on which computer programming or data can be stored for access by the processor 500. The stored data includes one or more databases containing information associated with network users or other network entities. Taken together, the storage devices will be referred to collectively as storage devices 570.

A drive controller 550 controls the hard drive 524, CD drive 526 and floppy drive 528. Also depicted in FIG. 5 is a display controller 520 interconnected to display interface 521, a keyboard controller 530 interconnected to keyboard interface 530, a mouse controller 540 interconnected to mouse interface 541 and a modem 560 interconnected to I/O port 65, all of which are connected to the bus 510. The modem 560 and interconnected I/O port 565 serve as a network interface and are used to transmit and receive signals via the network 10 as described herein. Those skilled in the art will recognize that another type of network interface could be easily substituted for that shown. It should also be understood that, if desired, other components could be connected to the bus 510, or that less than all the components shown in FIG. 5 could be connected to the bus 510. By accessing the stored computer programming, the processor 500 is driven to operate in accordance with the present invention.

Multifactor Split Private Key Asymmetric Cryptography

As described above in the background, in asymmetric cryptography, the asymmetric crypto-key has a private-public key pair, which will be referred to below as D and E, with ciphertext C=Encrypt(M,E) and Decrypt(C,D)=M, where M is a message encrypted by the entity, other than the entity associated with the asymmetric crypto-key, which has access to the associated entity's public key E, and decrypted by the entity associated with the asymmetric crypto-key using that entity's private key D. It will be recognized that reverse relationship also holds true. That is, the private key D could alternatively be used to encrypt the message M thereby creating the ciphertext, in which case the public key E is applied to decrypt the message M.

In split private key asymmetric cryptography, the private key is split into multiple private key portions, which will be referred to below as $D_1$ and $D_2$, where $D_1*D_2=D \mod \Phi(N)$. It will be recognized that, if desired, the private key could split into more than two private key portions, e.g. $D_1$, $D_2$ and $D_3$, where $D_1*D_2*D_3=D \mod \Phi(N)$. Thus, with the split private key, ciphertext C=Encrypt(M,E) and Decrypt(C, $D_1*D_2$)=M.

In multifactor split private key asymmetric cryptography, at least one of the multiple private key portions, e.g. $D_1$ and/or $D_2$, is derived from multiple factors. The invention will be described below with respect to one private key portion of the asymmetric crypto-key, which will be referred to as the first private key portion $D_1$, being derived using the multiple factors. Additionally, while the invention will be described below with respect to the first private key portion $D_1$ being derived from two factors, it should be understood that the invention can be easily adapted to a private key portion derived from more than two factors, as will be well understood by those skilled in the art from the following description.

The entity associated with the first private key portion $D_1$ will be referred to below as a user. However, it should be understood that preferably each individual network and each distinguished entity represented on the network 10, is associated with a multifactor split asymmetric crypto-key and hence has an associated first private key portion. Additionally, if desired, each merchant and sponsor represented on the network 10 could also be associated with a multifactor split asymmetric crypto-key and, if so, would likewise have an associated first private key portion.

The user is represented on the network by a user network device, such as a PC, as has been described above. As discussed above in the background, each of the multiple factors will be under the control of the associated user or other entity. For purposes of the description below, one of the factors will correspond to the user's password and be sometimes referred to as $F_p$. Preferably, $F_p$ is derived from the user's password and not the user's password itself, although this is not mandatory, an $F_p$ could, if desired, be the user's password. The other factor will preferably be a crypto-key and be sometimes referred to as $F_k$. If the implementation included three factors, each of the other two factors would be a different crypto-key and might be sometimes referred to as $F_{k1}$ and $F_{k2}$.

It should be recognized that the use of factors corresponding to the user's password and to a crypto-key(s) is not mandatory, and those skilled in the art will understand that other type factors could be used if so desired. Additionally, although derivation of the first private key portion $D_1$ could, if desired, be accomplished by simply concatenating the multiple factors, preferably the first private key portion $D_1$ is derived by cryptographically combining $F_p$ and $F_k$, or, in a three factor private key portion, $F_p$, $F_{k1}$ and $F_{k2}$, using the PKCS-5 algorithm, as will be discussed further below.

The first private key portion $D_1$ is not stored in a persistent state, but must be generated whenever its use is desired. The first private key portion is however temporarily stored after being generated, so as to be usable to prove the user's identity multiple times without the user providing any authentication information. This temporary storage may be limited to a predefined time period, or to a predefined number of authentications.

The other private key portion, which will be referred to as the second private key portion $D_2$, is preferably stored in a persistent state under control of a network entity other than the user. The public key E is also preferably stored in a persistent state under the control of other than the user, so as to be available to at least one other entity. In some implementations, the public key E may be beneficially stored so as to be available to each and every merchant, sponsor distinguished entity, and/or other user represented on the network 100. The second private key portion $D_2$ and public key E could be stored under the control of a sponsor, a merchant or a distinguished entity, or the second private key portion $D_2$ and public key E could be respectively stored under the control of a different one of a sponsor, a merchant and a distinguished entity.

In some implementations, the second private key portion $D_2$ and public key E, or some portion of the public key E, are retained by the sponsor station 50, e.g. on hard disk 525, in association with a user's identifier (ID). In these implementations it may also be beneficial for the public key E to be stored on each merchant server 40-41, e.g. on hard disk 525, or on each merchant server 40-41 and each user PC 30-33, e.g. on hard disk 325, in association with a user's identifier (ID).

Storage of the Factors

As discussed in the background, preferably neither the user's password nor the corresponding factor $F_p$ is stored, except temporarily on RAM 323 of the user's PC 200 for only the time necessary, in the case of the password, to allow for generation of the corresponding factor $F_p$ after the user enters the password and, in the case of the corresponding factor $F_p$, to allow for generation of the first private key portion $D_1$ after the corresponding factor $F_p$ has been generated.

On the other hand, the other factor $F_k$ may be stored on either a user's PC 200, such as on hard disk 325, or on removable media configured to communicate with the user's PC, such as on USB memory stick 396, which is shown as USB flash memory, smart card 398, floppy disk 329, compact disk (CD) 327, or even as a zip drive (not shown) or digital camera (not shown). In a three factor implementation, beneficially the factor $F_{k1}$ is stored on the hard disk 325 of the user's PC 200, while the factor $F_{k2}$ is stored on a USB memory stick 396.

Securing a Stored Factor of a Multifactor Split Asymmetric Crypto-Key

As described in the above referenced application, in the multifactor split private key asymmetric cryptosystem developed by Tricipher, Inc., the factor $F_k$, in a two factor implementation, or each of the factors $F_{k1}$ and $F_{k2}$ in a three factor implementation, is preferably the private key of a private-public asymmetric key pair, including $D_k$, $D_{k1}$, or $D_{k2}$ and $E_k$, $E_{k1}$, or $E_{k2}$, as applicable, and having a modulus $N_k$, $N_{k1}$, or $N_{k2}$, also as applicable. For example, $D_{k1}$ and $E_{k1}$ as well as $D_{k2}$ and $E_{k2}$ may each form a conventional RSA private-public asymmetric key pair, although this is not mandatory. If the factor is stored on a user's computing device it is sometimes referred to as $D_{tether}$. On the other hand, if the factor is stored on removable media it is sometimes referred to as $D_{USB}$.

In a preferred three factor implementation of the multifactor split private key asymmetric cryptosystem developed by Tricipher, Inc., $F_{k1}=D_{tether}$, is stored on a user's computing device and is the private key of a private-public asymmetric key pair, including $D_{tether}$ and $E_{tether}$, and having a modulus $N_{tether}$. $F_{k2}=D_{USB}$, is stored on removable media and is the private key of a private-public asymmetric key pair, including $D_{USB}$ and $E_{USB}$, and having a modulus $N_{USB}$. The non-private parts of the factor keys, i.e., $E_{tether}$, $N_{tether}$, $E_{USB}$, and $N_{USB}$, are stored, for example, at a merchant, sponsor or distinguished entity server.

Typically, $D_{tether}$ is stored securely on the hard disk 324 of a user's PC 200 using the protection capabilities provided by the PC's operating system, preferably as a non-exportable private key in a Windows Operating System key-store. Of course, as desired, $D_{tether}$ could be stored in a Windows Operating System registry. Alternatively, $D_{tether}$ can be, as desired, stored in the trusted processing module (TPM). No matter where or how on the user's computing device $D_{tether}$ is stored, in the most basic configuration, $D_{tether}$ can only be used from the user's computing device upon which it is stored. That is, $D_{tether}$ is a non-exportable private key, stored only on the user device at which it will be used. However, as detailed in the above referenced application, the multifactor split private key asymmetric cryptosystem developed by Tricipher, Inc. also facilitates porting $D_{tether}$ to other devices for use thereat.

$D_{USB}$ is stored on removable media configured to communicate with the user's PC, perhaps most commonly on a USB flash memory 396. $D_{USB}$ also needs to be protected, since storing any kind of key in the clear should be avoided if possible. In the case of $D_{USB}$ this is particularly important because, if $D_{USB}$ is stored on the removable media in clear and the user misplaces or otherwise loses the removable media, an attacker could easily access, extract and/or copy $D_{USB}$ from the removable media, and potentially use $D_{USB}$ to impersonate the user. Thus, in the multifactor split private key asymmetric cryptosystem developed by Tricipher Inc., $D_{USB}$ is beneficially stored on the removable media in an encrypted state, as also indicated in the above referenced application.

Preferably, encryption of $D_{USB}$ is not performed with the user's password, because this would still leave $D_{USB}$ vulnerable to dictionary attacks and guessing attacks. If the factors include both $D_{tether}$ and $D_{USB}$, $D_{USB}$ could, as disclosed in the above referenced application, be encrypted using $D_{tether}$, which is stored, for example, on the user's PC. However, in a two factor implementation, where the factors include $D_{USB}$, but not $D_{tether}$, there is no tethering key to encrypt $D_{USB}$. Furthermore, even in a three factor implementation, if $D_{USB}$ is encrypted using $D_{tether}$, an attacker with access to the removable media, as well as the user's PC or other computing device storing $D_{tether}$ and the user's password, could obtain $D_{tether}$ from the user's computing device and decrypt $D_{USB}$ by applying $D_{tether}$. This would in turn allow the attacker to use the user's password, $D_{USB}$ and $D_{tether}$ to generate the first private key portion, e.g. D1. Having generated the first private key portion, the attacker would now be in a position to impersonate the user.

Accordingly, the following describes a technique to further improve the security of stored factors, such as $D_{USB}$ and/or $D_{tether}$, which will be used to generate multifactor split private keys of an asymmetric crypto-key.

Key Generation Protocol-Initial Generation and Distribution of a Multifactor Split Asymmetric Crypto-Key with a Rolling Crypto-Key to Enhance the Security of a Stored Factor Referring now to FIG. 6, preferably the generation of the multifactor split asymmetric crypto-key begins with the generation of the factors. The following operations will be discussed in terms of a two factor implementation. In this implementation, one factor corresponds to the password, which has sometimes been referred to above as $F_p$. The other factor is the private key of an asymmetric crypto-key generated for storage on removable media, which has sometimes been referred to above as $F_k$.

—Generation of the Factor—

In this implementation, the processor 300 of the user's PC 200, executing programmed instructions stored on the hard disk 325, generates a first asymmetric crypto-key pair in step 600. As the factor will, in the particular implementation being described, be stored on the USB memory stick 396, which is shown as USB flash memory, the asymmetric crypto-key pair generated in step 600 will, hereafter, be referred hereafter as $D_{USB}$, $N_{USB}$ and $E_{USB}$, $N_{USB}$, where $D_{USB}=F_k$. Preferably, the crypto-key pair is an RSA asymmetric crypto-key, although this is not mandatory and another type of crypto-key of even something other than a crypto-key could be used, if desired. In other implementations, this factor could, if desired, be generated by the processor 500 of a network server 400, executing programmed instructions stored on the hard disk 525. As N is a well known modulus and not of particular relevance to the present invention, the generated asymmetric crypto-key pair will, at times, be described below only in terms of the private key $D_{USB}$ and public key $E_{USB}$.

—Generation of the Rolling Key—

At step 605, the processor 300 of the user's PC 200 also generates another, or second, asymmetric crypto-key pair, having a private key $D_R$ and a public key $E_R$, and a modulus $N_R$. This asymmetric crypto-key pair will serve as a rolling crypto-key and be used to secure $D_{USB}$ when stored on the USB memory stick 396. The processor 300 associates this rolling key with $D_{USB}$, $E_{USB}$ and $N_{USB}$. Preferably, the rolling key is an RSA asymmetric crypto-key pair, although this is not mandatory as another type of asymmetric crypto-key pair could also be used as the rolling key. Here again, in other implementations, the rolling key could, if desired, be generated and associated with the factor $D_{USB}$ by the processor 500 of a network server 400, executing programmed instructions stored on the hard disk 525.

—Securing the Factor with the Rolling Key—

In step 610, the processor 300 of the user's PC 200 encrypts the factor $D_{USB}$ with either the private key $D_R$ or public key $E_R$ of the rolling asymmetric key pair generated in step 605. In this implementation, private key $D_R$ is used for this encryption, i.e. ciphertext $CD_{USB}=\text{Encrypt}(D_{USB}, D_R)$. Thus, $D_{USB}$ can now only be used to derive the first private key portion if it is first decrypted using public key $E_R$, i.e. $\text{Decrypt}(CD_{USB}, E_R)=D_{USB}$.

Optionally, but preferably, at step 612 the processor 300 of the user's PC 200 encrypts $D_R$, i.e. ciphertext $CD_R=\text{Encrypt}(D_R, K_{DR})$. In this regard, one option is to encrypt $D_R$ using a key which is stored on the user's PC 200, such as another of the multi-factors for generating D1, e.g. $D_{tether}$, in which case the key would typically be different for each user Another option is to encrypt $D_R$ using a key that is built into the operating system or other software that is being executed by processor 300 of the user's PC 200, in which case the key would typically be the same for each user. It will be recognized that the key used to encrypt $D_R$ could be an asymmetric or symmetric key, but the rolling key $D_R$ itself must be part of an asymmetric crypto-key pair, because one of the keys of the asymmetric private-public crypto-key pair, in this implementation $E_R$, must be stored by an entity other than the user.

At step 615, the processor 300 of the user's PC 200 stores the optionally encrypted private rolling key $D_R$ in association with, e.g. co-located with, ciphertext $CD_{USB}$ on the USB memory stick 396.

—Distribution of the Rolling Key—

At step 620, the processor 300 of the user's PC 200 directs transmission of the non-private portions of the generated factor crypto-key pair, i.e., $E_{USB}$ and $N_{USB}$, as well as the other key of the rolling crypto-key pair not used to secure, i.e. encrypt, the factor $D_{USB}$, to a second network device. Since the first network device is associated with the user in the implementation being described, the second network device is associated with a network entity other than that user. The entity could be a sponsor, merchant or distinguished entity represented on the network by a server as discussed above. In this implementation the transmission is to sponsor station 50 via network 10. Since private rolling key $D_R$ is used to secure the factor $D_{USB}$, public rolling key $E_R$ and $N_R$, are directed by the processor 300 to sponsor station 50 via network 10. In accordance with the processor directive, the modem 360 transmits $E_{USB}$, $N_{USB}$ and $E_R$, $N_R$ via the I/O port 365. It should be appreciated that this transmission could be broken into multiple transmissions, and/or could be encrypted with the symmetric key/one time activation code, or even another key. Preferably, at least the transmitted $E_{USB}$ and $E_R$ are encrypted with the symmetric key/one time activation code, or other key. Of course, as desired, either or both of $N_{USB}$ and $N_R$ could also be encrypted. The sponsor station server 400 receives $E_{USB}$, $N_{USB}$ and $E_R$, $N_R$ via the I/O port 565. The received $E_{USB}$, $N_{USB}$ and $E_R$, $N_R$ are directed by the modem 560 to the processor 500.

Optionally, but preferably, at step 622 the processor 500 of the sponsor server 400 encrypts $E_R$, i.e. ciphertext $CE_R=\text{Encrypt}(E_R, K_{ER})$ and $E_{USB}$, i.e. ciphertext $CE_{USB}=\text{Encrypt}(E_{USB}, K_{EUSB})$ With regard to $E_R$, one option is to encrypt $E_R$ using a key that has been generated by and stored on the sponsor server 400, e.g. a generated symmetric key. Another option is to encrypt $E_R$ using a key that is built into the operating system or other software that is being executed by processor 500 of the sponsor's server 400. With regard to $E_{USB}$, one option is to use the public key $E_R$ to encrypt $E_{USB}$. Other options are to encrypt $E_{USB}$ using a key, e.g. a symmetric key, that has been generated by and stored on the sponsor's server 400 or a key that is built into the operating system or other software that is being executed by processor 500 of the sponsor's server 400. It will be recognized that the key(s) used to encrypt $E_R$ and/or $E_{USB}$ can be asymmetric or symmetric, but the rolling key $E_R$ itself must be part of an asymmetric crypto-key pair, because one of the keys of the asymmetric private-public crypto-key pair, in this implementation $D_R$, must be used to secure the factor $D_{USB}$ and be stored by the user device.

At step 625, the processor 500, in turn, directs the storage of received, optionally encrypted $E_{USB}$ and $N_{USB}$ in association with received, optionally encrypted $E_R$ and $N_R$, preferably on the hard disk 525 of the sponsor station server 400. Whether or not encrypted, $E_{USB}$, $N_{USB}$ and $E_R$, $N_R$ are preferably stored in a persistent state on hard disk 525, in association with a applicable user's identifier (ID).

At step 630, after directing transmission of $E_{USB}$, $N_{USB}$ and $E_R$, $N_R$ at step 620, the processor 300 of the user's PC 200 destroys at least $E_{USB}$ and $E_R$. The processor 300 of the user's PC 200 may also, if desired, destroy $N_{USB}$ and $N_R$. Accordingly, the processor no longer has access to $E_{USB}$ and $E_R$, and additionally may also no longer have access to $N_{USB}$ and $N_R$.

Accordingly, after steps 625 and 630 are completed, the applicable user device 30 has access to the ciphertext $CD_{USB}$, which is the factor $D_{USB}$ encrypted with the rolling key $D_R$, and the rolling key $D_R$ itself stored on the user's USB memory stick 396, whenever the portable USB memory stick 396 is interconnected with the applied to user device 30. The sponsor station 50 has access to public factor key $E_{USB}$, $N_{USB}$ and public rolling key $E_R$, $N_R$, which are persistently stored in associated with the user's ID on hard disk 525.

—Generation of the User's Multifactor Split Asymmetric Crypto-Key—

At step 635, the processor 300 of the user's PC 200 generates yet another, i.e. a third, asymmetric crypto-key pair, including private key $D_U$, public key $E_U$, and modulus $N_U$, which will serve as the user's asymmetric crypto-key. Here again, in other implementations, the user's asymmetric crypto-key could, if desired, be generated by the processor 500 of a network server 400, executing programmed instructions stored on the hard disk 525.

At step 640, the processor 300 of the user's PC 200 splits $D_U$ into at least a first private key portion $D_{U1}$, which corresponds to the first private key portion sometimes referred to above, as D1 and a second private key portion $D_{U2}$, which corresponds to the second private key portion sometimes referred to above as D2, by first determining $D_{U1}$, and then determining $D_{U2}$ utilizing conventional techniques based on the well known relationship between $D_{U1}$ and $D_{U2}$, i.e. $D_{U1}*D_{U2}=D \bmod \Phi(N)$.

The processing to determine $D_{U1}$ is based upon the multiple factors. As described above, in this implementation the multiple factors are the factor $F_p$, which corresponds to the user's password, and the factor $D_{USB}$, which is a private key of an asymmetric crypto-key pair. However, as noted above, the multiple factors could be any two or more of the user password, $D_{USB}$, another factor commonly referred to as $D_{tether}$, which is derived in a manner similar to $D_{USB}$ but stored on the user's PC 200 and/or other type factors.

In this implementation, the processor 300 of the user's PC 200 calculates $D_{U1}$ utilizing the PKCS-5 algorithm, which is a well known one way function preferably stored on the hard disk 325. The preferred equation for $D_{U1}$ is as follows:

$$D_{U1}=\text{PKCS-5}(\text{sign}\{\text{Sha-1}(\text{password}),D_{USB}\},\text{salt,iteration count}) \quad (1)$$

Thus, as shown in equation (1), $D_{U1}$ is computed in by taking a first Sha-1 hash of the password, where Sha-1 (password)=$F_p$, and transforming this quantity with $D_{USB}$, and then using the result of this transformation as an input to the PKCS-5 algorithm, along with the salt and the iteration count. After the determination of $D_{U1}$, the user's PC 200 has knowledge of $D_{U1}$, $D_U$ and $N_U$. Accordingly, in step 650, the processor 300 of the user's PC 200 can determine $D_{U2}$ based on the relationship $D_{U1}*D_{U2}=D_U \bmod \Phi(N_U)$, and thereby complete the splitting of $D_U$ by computing $D_{U2}$. For those cases in which it is desired to use the password, $D_{USB}$ and $D_{tether}$ as the multiple factors, the following equation for determining $D_{U1}$ can be used:

$$D_{U1}=\text{PKCS-5}(\text{sign}\{\text{Sha-1}(\text{sign}\{\text{Sha-1}(\text{password}),D_{tether}\}),D_{USB}\},\text{salt,iteration count}) \quad (2)$$

Thus, as shown in equation (2), $D_{U1}$ is computed by taking a first Sha-1 hash of the password, where Sha-1 (password) =$F_p$, and transforming this quantity with $D_{tether}$, taking a second Sha-1 hash of the transformed quantity and transforming the second Sha-1 hash with $D_{USB}$, and then using the result of this second transformation as an input to the PKCS-5 algorithm, along with the salt and the iteration count. After the determination of $D_{U1}$, the user's PC 200 has knowledge of $D_{U1}$, $D_U$ and $N_U$. Accordingly, the processor 300 of the user's PC 200 can determine $D_{U2}$ based on the relationship $D_{U1}*D_{U2}=D_U \bmod \Phi(N_U)$, and thereby complete the splitting of $D_U$.

For those cases in which it is desired to use the password and $D_{tether}$ as the multiple factors, but not $D_{USB}$, the following equation for determining $D_{U1}$ can be used:

$$D_{U1}=\text{PKCS-5}(\text{sign}\{\text{Sha-1}(\text{password}),D_{tether}\},\text{salt, iteration count}) \quad 3)$$

Thus, as shown in equation (3), $D_{U1}$ is computed in a novel manner by taking a first Sha-1 hash of the password, where Sha-1 (password)=$F_p$, and transforming this quantity with $D_{tether}$, and then using the result of this transformation as an input to the PKCS-5 algorithm, along with the salt and the iteration count. After the determination of $D_{U1}$, the user's PC 200 has knowledge of $D_{U1}$, $D_U$ and $N_U$. Accordingly, the processor 300 of the user's PC 200 can determine $D_{U2}$ based on the relationship $D_{U1}*D_{U2}=D_U \bmod \Phi(N_U)$, and thereby complete the splitting of $D_U$.

After the processor 300 of the user's PC 200 determines $D_{U2}$, at step 655 the processor 300 destroys $D_U$ and $D_{U1}$.

—Distribution of the User's Multifactor Split Asymmetric Crypto-Key—

At step 660, the processor 300 directs transmission of $D_{U2}$, $E_U$ and $N_U$ to the entity with which the user is establishing a multifactor asymmetric crypto-key. As discussed above, the entity could be a sponsor, merchant or distinguished entity represented on the network by a server. However, in this particular implementation the transmission is to sponsor station 50 via network 10. In accordance with the processor directive, the modem 360 transmits $D_{U2}$, $E_U$ and $N_U$ via the I/O port 365. It should be appreciated that this transmission could be broken into multiple transmissions, and could be encrypted with the symmetric key/one time activation code, or even another key. Preferably, at least the transmitted $D_{U2}$ is encrypted with the symmetric key/one time activation code, or other key. Of course, as desired, either or both of $E_U$ and $N_U$ could also be encrypted. It will also be recognized that the transmission in steps 620 and 660 could be combined in a single transmission, if so desired.

The sponsor station server 400 receives $D_{U2}$, $E_U$ and $N_U$ via the I/O port 565. The received $D_{U2}$, $E_U$ and $N_U$ are directed by the modem 560 to the processor 500. Optionally, but preferably, at step 662 the processor 500 of the sponsor server 400 encrypts $D_{U2}$, i.e. ciphertext $C_{DU2}=\text{Encrypt}(D_{RU2}, K_{DU2})$ and Eu, i.e. ciphertext $CE_U=\text{Encrypt}(E_U, K_{EU})$ One option is to encrypt $D_{U2}$ and/or $E_U$ using a key that has been generated by and stored by the sponsor server 400. Another option is to encrypt $D_{U2}$ and/or $E_U$ using a key that is built into the operating system or other software that is being executed by processor 500 of the sponsor server 400. It will be recognized that the key(s) used to encrypt $D_{U2}$ and/or $E_U$ could be asymmetric or symmetric.

At step 665, the processor 500 directs the storage of optionally encrypted $D_{U2}$ and $E_U$, along with $N_U$, in association with $E_{USB}$, $N_{USB}$ and $E_R$, $N_R$, preferably on the hard disk 525 of the sponsor station server 400. $D_{U2}$, $E_U$ and $N_U$ are also preferably stored in a persistent state on hard disk 525, in association with the applicable user's identifier (ID).

At step 667, after directing transmission of $D_{U2}$, $E_U$ and $N_U$ at step 660, the processor 300 of the user's PC 200 destroys $D_{U2}$. The processor 300 may also destroy $E_U$ and $N_U$, if so desired. Accordingly, the processor no longer has access to $D_{U2}$, and additionally may also no longer has access to $E_U$ and $N_U$.

Alternatively the key association entity, in this implementation sponsor station 50, could generate one or more of the first, second, or third asymmetric crypto-key pairs, and perform the splitting of $D_U$. If a device representing an entity other than the applicable user, e.g. sponsor server 400, generates either the first or the second asymmetric crypto-key pair, or both, it will direct transmission of one part of each key pair, i.e. the private or public key of the applicable generated asymmetric crypto-key pair, in this implementation $D_R$ and/or $D_{USB}$, to the user PC 200 and destroy the copy at the server 400, so that only the user's PC 200, through the storage on the hard disk 325 or USB memory stick 396, has access to the key or keys, in this implementation access to $D_R$ and/or $D_{USB}$. If a device representing an entity other than the applicable user generates the third asymmetric crypto-key pair and performs the splitting, it need not provide any associated information to the user's PC 200. However, preferably the user will provide the password to the generating device for use with the PKCS-5 algorithm. Also, the generating device having generated $D_U$, and $D_{U2}$ destroys $D_{U1}$, $D_U$ and the password, and stores $D_{U2}$, preferably on a hard disk and in a persistent state.

Login Protocol-with Generation and Distribution of a New Rolling Key to Enhance the Security of a Stored Factor The entity to which the user device 30 directed the transmissions described in steps 620 and 660, in this implementation a sponsor represented by the sponsor station 50, provides trusted authentication of an individual user during login. For this implementation, the login protocol is described in detail below in the context of a request for authentication being received by the user device 30 from the sponsor station 50. However, those skilled in the art will recognize that the described protocol is easily adapted to requests for authentication received from other than the sponsor station 50. It will also be understood that in the described protocol, the authentication request from the sponsor station 50 may represent an authentication request initiated by an entity other than the sponsor. That is, the authentication request may have been initiated by a merchant represented by a merchant server 40-41 or another user represent by another user device 31-33 or a trusted distinguished entity represented by distinguished server 60-62. Furthermore, if the user device 30 had directed the transmissions described in steps 620 and 660 to an entity other than the sponsor station 50, e.g. to a merchant represented by a merchant server 40-41 or another user represent by another user device 31-33 or a trusted distinguished entity represented by distinguished server 60-62, the authentication request could represent an authentication request initiated by a sponsor represented by sponsor station 50. It will also be recognized that a merchant server, such as merchant server 40, or a distinguished server, such as distinguished server 60, might also functioned as the sponsor server 50, although generally this will not be the case.

—Initial User Authentication and Unlocking the Secured Factor—

Figure 7A:
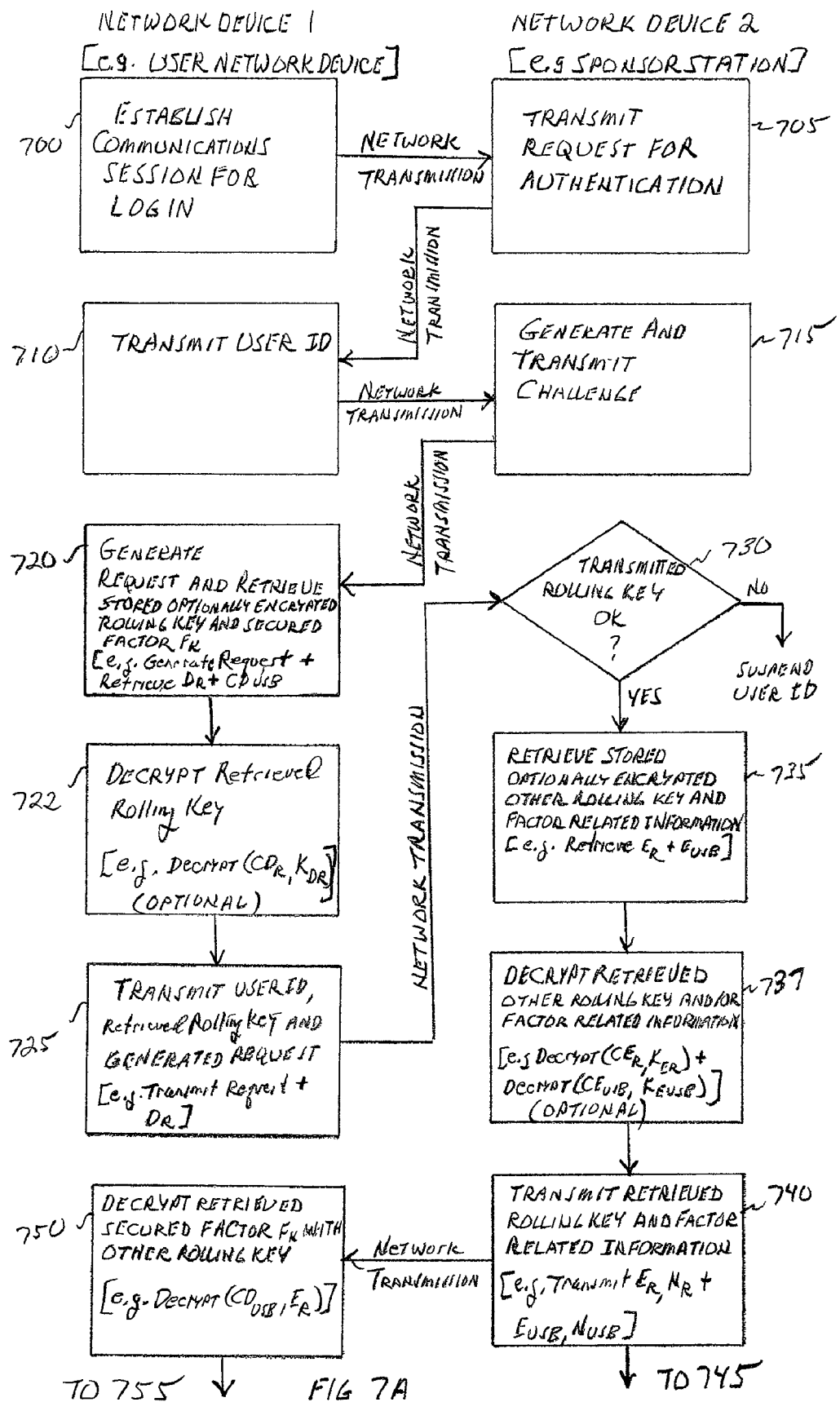
FIGS. 7A-7B depict a flow chart showing operations performed during the user log-in protocol, including generating and distributing a new rolling key to enhance the security of a stored factor.
Figure 7B:
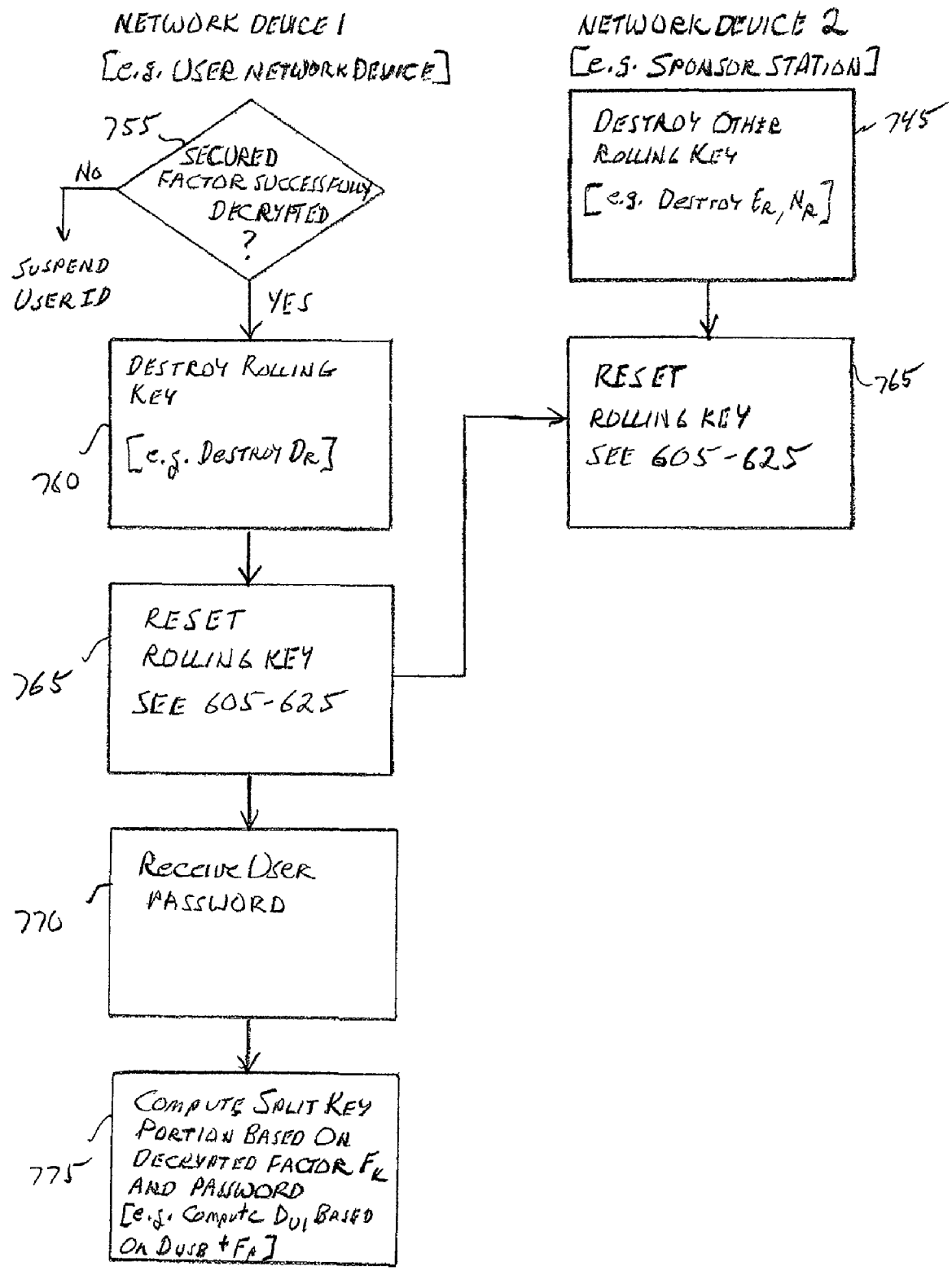

Referring now to FIG. 7, at step 700, a communication session is established between the user device 30 and the sponsor station 50 via network 10, and at step 705, the processor 500 of the sponsor's station 50 directs transmission of and, in accordance with the directive, the modem 560 and I/O port 565 transmit a request, via network 10, to user device 30, requesting that the applicable user authenticate himself or herself to the sponsor station 50. The I/O port 365 receives the transmission and the modem 360 directs the request to the processor 300 of the user's device 30. At step 710, the processor 300 of user device 30 directs and the modem 360 and I/O port 365 transmit the user's user ID to the sponsor station 50 via network 10. It should be understood that while the user's ID itself is not encrypted by the user's device 30 and therefore can be considered as transmitted in the clear, in some, if not most, implementations, communications between the user device 30 and the sponsor station 50 are preferably protected using server side SSL encryption, which is well understood by those skilled in the art and therefore not further described herein.

The transmitted user ID is received by I/O port 565 and directed by modem 560 to the processor 500 of the sponsor station 50. Next, at step 715, the processor 500 of sponsor station 50 generates a challenge, which consists of a random number R1 and a time stamp, and directs transmission of the same to the user device 30 via the network 10, also in the clear. In accordance with the directive the challenge is transmitted via the modem 560 and I/O port 565.

The transmitted challenge is received by the I/O port 365 and directed by the modem 360 to the processor 300. In response to the challenge, the processor 300 of the user device 30, at step 720, generates a request including a permission request (PR) that consists of the challenge, a time stamp, and a random number R2. The generated request also includes a request for $E_{USB}$, $N_{USB}$ and $E_R$, $N_R$.

In order to authenticate himself or herself to the sponsor station 50, the user, represented by the user device 30, must demonstrate knowledge of $D_{U1}$, the factors associated with $D_{U1}$, in this implementation $F_p$ and $D_{USB}$, and/or the one of the private-public rolling crypto-key pair which has been used to secure a factor, in this implementation the private rolling key $D_R$ that has been used to secure factor $D_{USB}$. Preferably, the user must prove knowledge of all these items. It should be noted that, as discussed above, the user device 30 does not provide the user's password to the sponsor station 50. Thus, at step 720, the user makes the removable media 396 upon which $D_{USB}$ encrypted with $D_R$ and $D_R$ itself are stored available to user device 30 for retrieval by processor 300.

If $D_R$ is stored in an encrypted state, in step 722 the processor 300 of user device 30 decrypts $D_R$, i.e. $D_R$=Decrypt ($CD_R$, $K_{DR}$), prior to directing transmission of $D_R$, or preferably other proof of knowledge of $D_R$, such as a challenge of time stamp signed with $D_R$, to the sponsor station 30. In step 725, the processor 300 then directs, and in accordance with this director, the modem 360 and I/O port 365 function to transmit the proof of knowledge of $D_R$ and the user's ID, together with the generated request, which includes the PR and the request for $E_{USB}$, $N_{USB}$ and $E_R$, $N_R$, to the sponsor station 50 via the network 10.

The information transmitted in step 725 is received by I/O port 565 and directed by modem 560 to processor 500. At step at step 730, the processor 500 of sponsor station 50 determines whether or not the proof of knowledge of $D_R$ transmitted by the user device 30 does in fact prove knowledge of the private rolling key that has been used to secure, i.e. encrypt, $D_{USB}$. This can be done using any of several well known techniques. For example, if $D_R$ itself is transmitted, the processor 500 could encrypt a test message TM using the public rolling key $E_R$, i.e. ciphertext CTM=Encrypt(TM, $E_R$), which as discussed above is stored at the sponsor station 50, and then attempt to decrypt TM using the transmitted private rolling key $D_R$, i.e. Decrypt(CTM,$D_R$)=TM. Alternatively, if a challenge or time stamp signed with $D_R$ is transmitted, the processor 500 can attempt to recover the challenge or time stamp using public rolling key $E_R$. If the TM, challenge, or time stamp, as applicable, is successfully recovered, the user device 30 has proved to the sponsor station 50 that the user has knowledge of that one of the private-public rolling crypto-key pair, i.e. in this implementation $D_R$, used to secure the factor $D_{USB}$. If not, the login will not be completed and the processor 500 preferably suspends the user's ID.

If the processor 500 determines that the transmitted proof of knowledge of private rolling key $D_R$ does indeed prove knowledge of the rolling crypto-key used to secure the factor $D_{USB}$, at step 735 the processor 500 retrieves $E_{USB}$, $N_{USB}$ and $E_R$, $N_R$ from storage. If either or both $E_{USB}$ and $E_R$ are stored in an encrypted state, in step 737 the processor 500 decrypts $E_{USB}$ and/or $E_R$, i.e. $E_{USB}$=Decrypt($CE_{USB}$, $K_{EUSB}$) and/or $E_R$=Decrypt($CE_R$, $K_{ER}$), prior to transmitting these keys to the user station 30. At step 740, the processor 500 directs and, in accordance with this directive the modem 560 and I/O port 565 function to transmit $E_{USB}$, $N_{USB}$ and $E_R$, $N_R$ to user device 30 via the network 10. In step 745, which preferably is performed at this point, the processor 500 destroys $E_R$, $N_R$ or sets a flag or other indicator that $E_R$, $N_R$ must be reset, or both.

The keys transmitted in step 740 are received by the I/O port 365 and directed by the modem 360 to the processor 300. At step at step 750, the processor 300 of user device 30 applies the public rolling key $E_R$ to unlock the factor $D_{USB}$ that had been stored on the removable media 396 encrypted with the rolling private key $D_R$, i.e. ciphertext $CD_{USB}$=Encrypt($D_{USB}$, $D_R$). More particularly, the processor 300 proceeds to decrypt ciphertext $CD_{USB}$ using the received public rolling key $E_R$, i.e. Decrypt($CD_{USB}$,$E_R$)=$D_{USB}$. In step 755, the processor 300 determines if $D_{USB}$ is successfully recovered. If so, the sponsor station 50 has proved to the user device 30 that the sponsor has knowledge of the other of the private-public rolling crypto-key pair that was not used to secure the factor $D_{USB}$, and hence authenticates the sponsor to the user. If not, the processor 300 could, for example, suspend use of the user's ID and notify the sponsor station 50 and perhaps other network entities of the suspension of the user's ID.

—Resetting the Rolling Key—

After the processor 300 successfully decrypts the factor $D_{USB}$, in step 760 processor 300 preferably destroy $D_R$ so that it is no longer available or stored on the removable media 396. In step 765, the user device 30 and sponsor station 50 reset the rolling asymmetric crypto-key. In this regard, processor 300 generates a new rolling asymmetric crypto-key pair having a private key, which will be referred to as $D_{R1}$, a public key, which will be referred to as $E_{R1}$, and a modulus $N_{R1}$. In this implementation the processor 300 of user device 30 again secures the factor, this time by encrypting $D_{USB}$ with $D_{R1}$, and stores the secured factor, i.e. $D_{USB}$ encrypted with $D_{R1}$, along with $D_{R1}$ itself, on the removable media 396. The processor 300 also directs, and in accordance with this directive the modem 360 and I/O port 365 function to transmit $E_{R1}$, $N_{R1}$ to the sponsor station 50, which stores $E_{R1}$, $N_{R1}$ in association with $E_{USB}$, $N_{USB}$ to reset $E_R$, $N_R$, which are deleted from the hard disk 525 storage of sponsor station server 400. After distribution to the sponsor station 50, the user device 30 destroys its copy of $E_{R1}$, $N_{R1}$. The above described resetting is performed at each new login and in the manner describe in steps 605-625 with reference to $E_R$ and $N_R$, as applicable.

—Deriving the User's Portion of the Split Private Key and Completing Initial Login Requirements—

At step 770, the processor 300 of the user device 30 directs the display controller 520 to present, on display interface 521, a request that the user enter the user's password. In response to the request, the user enters a password via keyboard 331, which is directed by keyboard controller 320 to processor 300. After receipt of the user's password, at step 775 the processor 300 of user device 30 computes $D_{U1}$ by taking a first Sha-1 hash of the user's password, where Sha-1 (password)=$F_p$, and transforming this quantity with recovered factor $D_{USB}$, i.e. ciphertext $CF_p$=Encrypt ($F_p$, $D_{USB}$), and then using the result of this transformation, i.e. $CF_p$, as an input to the PKCS-5 algorithm, along with the salt and the iteration count. Thus, after completing step 775, the initial login procedure is completed and the user device 30 has knowledge of the first private key portion $D_{U1}$ of the split private key $D_U$ of the user's asymmetric crypto-key.

—Final User Authentication and Completing the Login Requirements

Because in this implementation only two factors are used to generate the private key portion $D_{U1}$, at step 800 the processor 300 of user network device 30 creates a signed permission request (SPR) using only $D_{U1}$, and $D_{USB}$, i.e. ciphertext CSPR=Encrypt(sign(PR,$D_{USB}$), $D_{U1}$). Note that neither the rolling key nor the password related factor $F_p$ are applied. It should, however, be noted that while the factor corresponding to the password, i.e, $F_p$, is preferably not used, it could be used in the SPR if so desired. The signed permission request has the following form:

$$\text{CSPR}=(\text{PR},\text{sign}(\text{Sha-1}(\text{PR}),D_{USB}))D_{U1} \quad (4)$$

Thus, in this implementation PR is combined with a Sha-1 hash of PR signed with $D_{USB}$, and this combination is then encrypted with $D_{U1}$. If an additional factor(s) were used to generate the split private key portion $D_{U1}$ in the present implementation, Sha-1 hash of PR signed with each additional factor and encrypted with $D_{U1}$ would also preferably be included in the a signed permission request (SPR). At step 805, the processor 300 of user device 30 directs, and in accordance with this directive the modem 360 and I/O port 365 function to transmit CSPR to the sponsor station 50 via network 10.

The I/O port 565 receives the transmitted CSPR and modem 560 directs the received CSPR to processor 500. In step 810, the processor of sponsor station 50 decrypts, if necessary, and applies $D_{U2}$, $E_U$ and $N_U$, which as discussed above have been previously stored by the sponsor station 50, to decrypt and thereby recover PR and sign (Sha-1 (PR), $D_{USB}$), i.e. Decrypt(CSPR, $D_{U2}$)$E_U$=PR+sign(Sha-1 (PR), $D_{USB}$). In step 815, the processor 500 verifies that the challenge included in the recovered PR is correct and, if so, thereby explicitly verifies the user's knowledge of $D_{U1}$. If not, the sponsor station processor 500 may suspend the user's ID.

At step 820 the processor 500 of sponsor station 50 decrypts, if necessary, and applies $E_{USB}$ and $N_{USB}$, which as discussed above have also been previously stored at the sponsor station 50, to decrypt and recover PR from sign (Sha-1 (PR), $D_{USB}$), i.e. Decrypt(SPR, $D_{USB}$)$E_{USB}$=PR. In step 825, the processor 500 verifies that the challenge included in this recovered PR is correct and, if so, thereby explicitly verifies the user's knowledge of $D_{USB}$. If not, the processor 500 suspends the user ID. The successful completion of step 825 explicitly verifies the user's knowledge of $D_{USB}$.

Furthermore, the successful completion of step 810-825 implicitly verifies the user's knowledge of the user's password, and hence also of factor $F_p$ and other factors, if any, required to correctly construct $D_1$. It will be recognized that, if desired, the user's knowledge of any of such other factors could be explicitly verified by the sponsor station 50 in a manner similar to that described with reference to steps 820 and 825, although this is not mandatory, and one or more of such direct additional verifications may be omitted depending on the implementation.

In this implementation, upon successful completion of step 825, the user is authenticated and the login is completed. Following completion of the login, the sponsor station 50 and the user device 30 interact to create a symmetric session crypto-key used to encrypt and MAC communications between the two. Creation and use of such a session key is well known in the art and according will not be further described here.

As described above, the use of rolling key to secure one or more factor needed to generate a private key portion of a user's split asymmetric crypto-key decreases the ability of an attacker to spoof the system. Even in the unlikely event that an attacker steals or otherwise obtains access to the encrypted factor, e.g. $CD_{USB}$, the rolling key, e.g. $D_R$, and the user's ID and password, the rolling key $D_R$ will become outdated the next time the user performs a login, whether it is successful, which will be the case if the user's login is performed prior to the attacker attempting to use the information to login as the user, or unsuccessful, which will be the case if the user's login is performed after the attacker has used the information to login as the user. This is because, in either case, the rolling key obtained by the attacker and that maintained by the user will be out of synchronization.

Furthermore, if the user's login is performed prior to the attacker attempting to login using the information, the rolling key that the attacker has access to will be out of synchronization with the corresponding key maintained by the authenticating network device, e.g. the sponsor station 50. On the other hand, if the user's login is performed after the attacker has logged-in using the information, the rolling key that the user has access to will be out of synchronization with the corresponding key maintained by the authenticating network device, e.g. the sponsor station 50. Thus the next attempted login, in the former case by the attacker and in the later case by the user, will result in an immediate suspension of the user's ID and thus the user's account.

In summary, the rolling key protection is difficult for an attacker to defeat. Furthermore, the use of an asymmetric crypto-key as the rolling key, with one of the asymmetric key pair stored by an entity other than the user, makes the system extremely difficult for an attacker to overcome.

The encrypting of a factor, such as $D_{USB}$, which serves as a first line of protection, in and of itself enhances the security, since the factor is never persistently stored in the clear. Even if a rolling key, such as $D_R$, is stored in the clear, which is not preferred, another rolling key, such as $E_R$, is still required to actually make use of $D_{USB}$, and therefore provides a second line of protection. The preferred encrypting of the rolling key, such as $D_R$, will serve as a third line of protection and further enhance the security, since in such case the rolling key is never persistently stored in the clear.

Yet, if all else fails, there is also another line of protection. More particularly, even if, for example, an attacker were to successfully steal the removable media from user and attempt to use it to successfully login, the attack would be foiled if the attacker does not have the user's ID, or the user's password or any other factors required to generate the applicable key portion of a split private, or for that matter public key.

However, even if the attacker were to overcome all of the above obstacles, the roaming of the rolling keys make it highly likely that the attacker would, at best, be able to spoof the system only one time before the rolling key which the attacker has access to becomes useless or the legitimate user becomes aware of the attack because the rolling keys are no longer in sync. Thus, an attacker using the rolling key stored by a user on a removable media or elsewhere, should quickly become apparent to the legitimate user and/or authenticating entity and result in prompt suspension of the user's ID and account after an attack, at least until the rolling key is reset.

Asymmetric Crypto-Key With Persistent and Non-Persistent Split Private Keys

—Overview—

Security of a private or public key portion of a split asymmetric crypto-key can be further enhanced by performing multiple splits of the private or public key, rather than just one split as has been described above. Stated another way, the private or public key can be split into two or more different splits to provide additional security.

More particularly, if as described above the user's asymmetric crypto-key is formed of a private key $D_U$ and a public key $E_U$ and the private key $D_U$ is split into $D_{U1}$ and $D_{U2}$ as shown in steps 635-650 of FIG. 6B, the private key $D_U$ is also split into, for example, $D_{U1}'$ and $D_{U2}'$, as will be described in detail below. Thus, for the same overall private key $D_U$, there are two different splits, with both of these splits corresponding to the same public key $E_U$.

The first split, which can be characterized as a non-persistent key split, results in a key portion $D_{U1}$ that is used only to establish the initial login during a session, and is therefore only used one time during the session. Accordingly, if $D_{U1}$ is generated by the user based on the user's password and/or other factors, it need never be stored on the user's network device 30, e.g. the user's PC, except for the very short period of time required after generation to complete the login for initial access. $D_{U1}$ is therefore relatively secure against attack, since its period of vulnerability, e.g. the period it is stored in the clear on RAM, is very short.

On the other hand, the second split, which can be characterized as a persistent key split, results in a key portion $D_{U1}'$ that is used repeatedly after initial login to access multiple different network sites and/or different information at a single network site requiring separate authentication during the session. Because $D_{U1}'$ and $D_{U2}'$ can be used multiple times during a single session, $D_{U1}'$ may need to be stored on the user's network device for reuse during a longer period of time than the required period of storage of $D_{U1}$. That is, after the initial access has been granted based on $D_{U1}$ and $D_{U2}$ during a session, the user can, during the same session, access one or more other different network sites and/or one or more Web pages at a single network site that require separate authentication without the need to reenter the user's password or to recreate the private key portion $D_{U1}'$ of the user's asymmetric crypto-key multiple times for each access. Thus, only $D_{U1}'$, from the second split, is stored for reuse on the user's network device, $D_{U1}$, from the first split, is never stored for reuse.

If an attacker is able to steal $D_{U1}'$, the attacker can potentially make improper use of that private key portion, but the use will be limited, for example by a preset allowed time period for use or a preset number of allowed reuses. In this regard, the other network entity which stores the other private key portions $D_{U2}$ and $D_{U2}'$, e.g. the sponsor station 50, will preferably limit the reuse of $D_{U1}'$ to a period of time, e.g. 1 hour, or number of separate authentications, e.g. 10, starting from initial login access based on $D_{U1}$ or $D_{U1}'$. Accordingly, the exposure to improper access by a successful attacker can be limited. After the limit has been reached, the reuse of $D_{U1}'$ by the attacker will no longer be allowed, since the other entity, e.g. the sponsor station 50, will no longer accept $D_{U1}'$ without the user re-logging-in with $D_{U1}$. Since $D_{U1}$ is neither known by the attacker nor obtainable from $D_{U1}'$, the attacker will have insufficient information to perform the required re-login.

—Generation of a User's Multifactor Split Asymmetric Crypto-Key with Persistent and Non-Persistent Split Private Keys—

The generation of a multifactor split asymmetric crypto-key is described above with reference to FIGS. 6A-6C. The following will further describe how the operations shown in FIGS. 6A-6C can be modified to enhance security of the private key portion of the user's asymmetric crypto-key by reducing vulnerability of a private or public key portion to attack. The modification will be most beneficial in those implementations where access to each of multiple different network sites and/or different web pages at a single network site is desired during a session, and access to each site or page requires re-authentication. Using the modified operation, the user can be allowed to access multiple different network sites and/or different information at a single network site during a session without reentering the user's password and without the need to recreate the private or public key portion of the user's asymmetric crypto-key during the applicable session, while also reducing vulnerability to a successful attack and eliminating the possibility of improper access for more than a limited time period or to more than a limited number of sites and/or different types of information.

The following operations will be discussed in terms of a two-factor implementation, but are easily adapted to a three or more factor implementation, as will be well understood by those of skill in the art. In the described implementation, one factor corresponds to the password, and has been referred to above as $F_p$. The other factor is the private key of an asymmetric crypto-key, which has been referred to above as $F_k$. However, it should be recognized that the factors could be of other types.

Figure 6A:
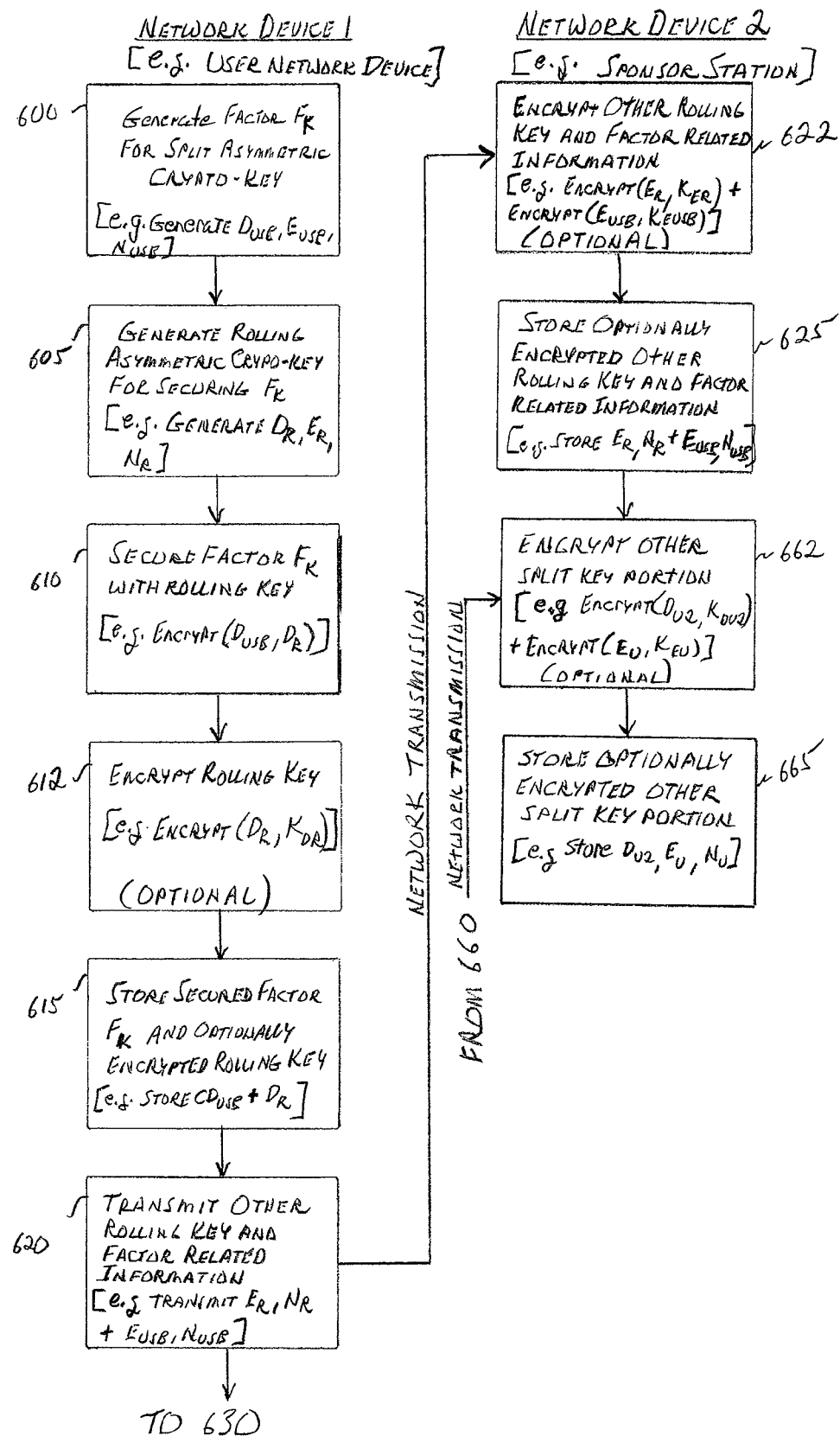
FIGS. 6A-6C depict a flow chart showing operations performed during the key generation protocol for initially generating and distributing a multifactor split asymmetric crypto-key with a rolling key to enhance the security of a stored factor.

Preferably, the factor and rolling key(s) are generated, the factor is secured, the rolling key(s) are distributed, and the asymmetric crypto-key is generated as previously described with reference to steps 600-635 of FIGS. 6A and 6B. As described in detail above, at step 635 of FIG. 6B, the processor 300 of the user's PC 200 generates an asymmetric key pair, including private key $D_U$, public key $E_U$, and modulus $N_U$, which will serve as the user's asymmetric crypto-key.

Figure 9:
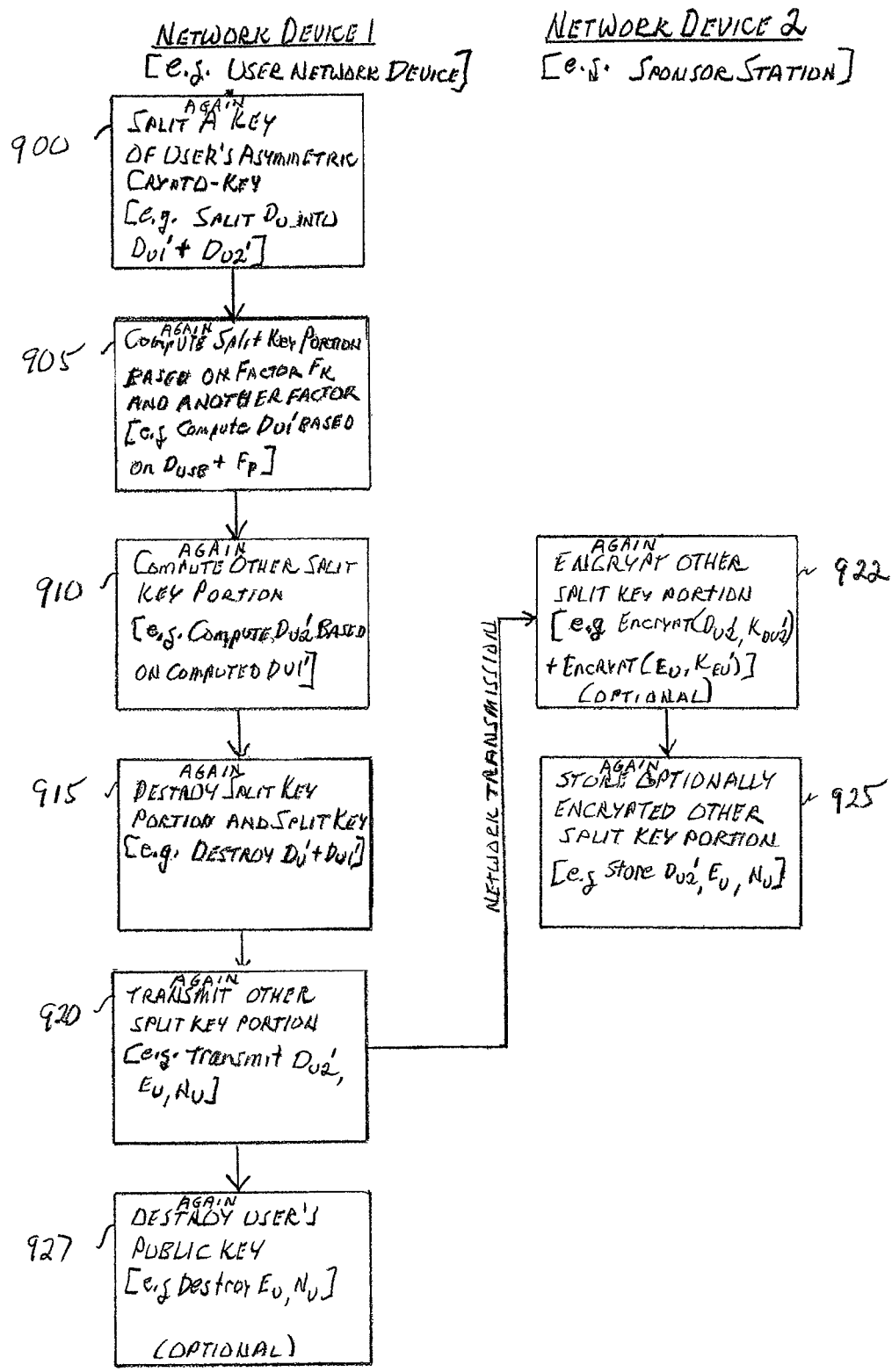
FIG. 9 depicts a flow chart showing other operations performed during the key generation protocol for initially generating and distributing a multifactor split asymmetric crypto-key with a persistent key to enhance the security of a stored private key portion of the multifactor split asymmetric crypto-key, in accordance with the present invention.

Referring to FIG. 9, in order to enhance security of a private key portion of the user's asymmetric crypto-key, the operations described in detail below are performed in addition to or in conjunction with the operations described with reference to steps 640-667 of FIGS. 6B and 6C.

As described above, at step 640 of FIG. 6B, the processor 300 of the user's PC 200 performs a first split of $D_U$ into at least a first private key portion, $D_{U1}$, and a second private key portion $D_{U2}$. At step 900 of FIG. 9, the processor 300 of the user's PC 200 performs a second split of $D_U$ into at least a first private key portion, $D_{U1}'$, and a second private key portion $D_{U2}'$, by determining $D_{U1}'$ and $D_{U2}'$ utilizing conventional techniques based on the well known relationship between $D_{U1}'$ and $D_{U2}'$, i.e. $D_{U1}'*D_{U2}'=D \mod \Phi(N)$, as will be described in greater detail below.

The processing to determine $D_{U1}'$ is based upon the same multiple factors as the processing to determine $D_{U1}$. For example, the multiple factors could be the factor $F_p$, which corresponds to the user's password, and the factor $D_{usb}$, which is a private key of an asymmetric key pair stored on a USB flash memory 396. However, as noted above, the multiple factors could be any two or more of $F_p$, $D_{USB}$, another factor commonly referred to as $D_{tether}$, which is derived in a manner similar to $D_{USB}$ but stored on the user's PC 200, and/or other factors which could be of any type.

Figure 6B:
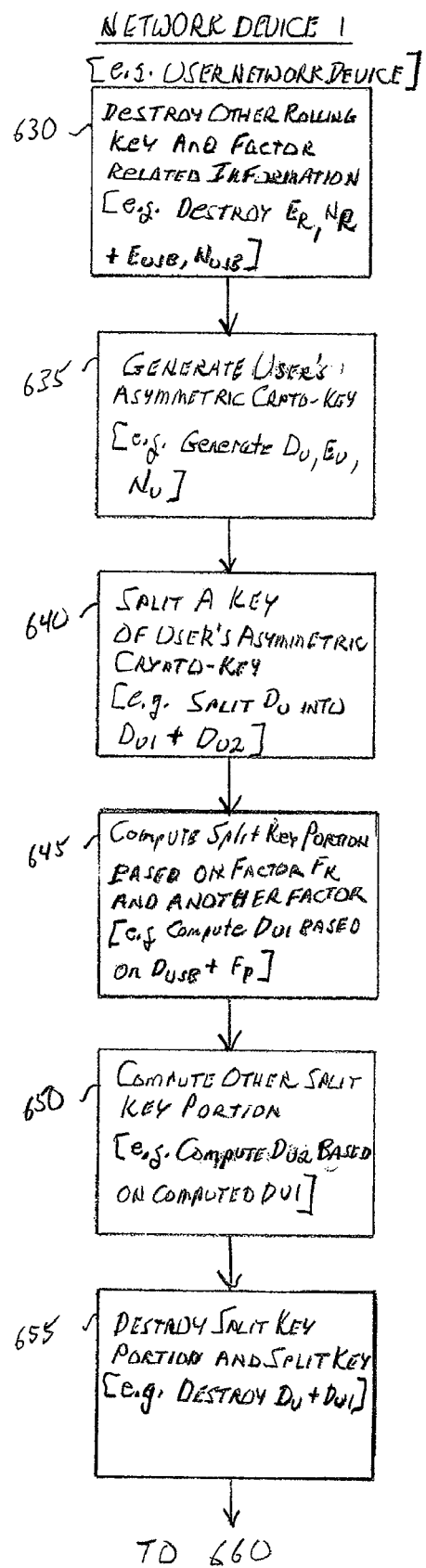
Figure 6C:
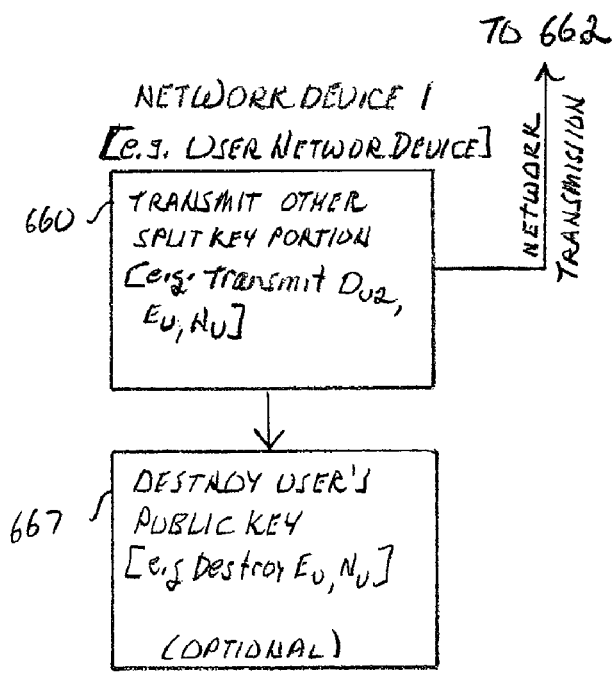

The processor 300 of the user's PC 200 calculates both $D_{U1}$, in step 640 of FIG. 6B, and $D_{U1}'$, in step 905 of FIG. 9, preferably utilizing the PKCS-5 algorithm. As noted above, this algorithm is a well known one way function and is beneficially stored on the hard disk 325. As described with reference to step 640, the preferred equation for $D_{U1}$ is as follows:

$$D_{U1}=\text{PKCS-5}(\text{sign}\{\text{Sha-1}(\text{password}),D_{USB}\},\text{salt},\text{iteration count}) \quad (5)$$

The preferred equation for computing $D_{U1}'$ in step 905 is as follows:

$$D_{U1}'=\text{PKCS-5}(\text{sign}\{\text{Sha-1}(\text{password}),D_{USB}\},\text{modified salt},\text{modified iteration count}) \quad (6)$$

Thus, as shown in equations (5) and (6), $D_{U1}$ and $D_{U1}'$ are both computed by taking a first Sha-1 hash of the password, where Sha-1 (password)=$F_p$, and transforming this quantity with $D_{USB}$, and then using the result of this transformation as an input to the PKCS-5 algorithm, along with a salt and an iteration count. However, both the value of the salt and value of the iteration count used in equation (5) are modified in equation (6). So while $D_{U1}'$ is computed from the same multiple factors and using the same algorithm as $D_{U1}$, the computation itself is slightly different, which results in the value of $D_{U1}'$ being different from that of $D_{U1}$.

More particularly, the value of one or more constants used in the applied algorithm, in this implementation in the PKCS-5 algorithm, are varied in the computation of $D_{U1}'$. The applicable value of the salt and iteration count must be reused every time the private key portion $D_{U1}$ is required to be reconstructed, so these values are available in the public key certificate of the user, i.e. the values are public and not secret. Accordingly, the value of each of the constants used to compute $D_{U1}$ are known and can be modified to compute $D_{U1}'$. Preferably, both the value of the salt and the value of the iteration count in the PKCS-5 algorithm are varied, although this is not mandatory and the modification could be limited to either one or the other of these constants.

For example, the salt may be modified in equation (6) by simply adding or subtracting the value 1, or some other preferably small value, to or from the salt value used in equation (5). Similarly, the iteration count may be modified in equation (6) by adding or subtracting the value 10, or some other preferably small number of iterations, to or from the iteration value used in equation (5). Any constant modifier could be employed. However, it will typically be beneficial not to select a modifier that is large, since this could result in additional computing. For example, if the iteration count is increased greatly in equation (6), this could require an increase in the computing requirements. Thus, it will normally be preferable to make the modification to the iteration count relatively small. In general, it will normally be appropriate to keep the modified salt and modified iteration count in equation (6) within the same degree of reference as the salt and iteration count in equation (5).

Irrespective of the modifiers selected for the constant or constants, there will be no way for an attacker to reconstruct $D_{U1}$ from $D_{U1}'$. This is because the properties of the PKCS5 algorithm and similar random number generation functions guarantee, to a large extent, that knowing $D_{U1}'$ will not allow an attacker to obtain $D_{U1}$. Indeed, modifying just the salt is sufficient to prevent correlation between $D_{U1}$ and $D_{U1}'$. Modifying the iteration count, even if the same salt were to be used, ensures that an attacker cannot go backwards. However, modifying only the iteration count does not prevent an attacker from going forward. Thus, it is preferable to modify both the salt and iteration count. This will both ensure the integrity of the one time private key portion, in this implementation $D_{U1}$, irrespective of an attacker gaining knowledge of $D_{U1}'$, and ensure that the attacker must obtain knowledge of all the multiple factors to independently compute both $D_{U1}$ and $D_{U1}'$.

As described above with reference to in step 650 of FIG. 6B, after determining $D_{U1}$, the user's PC 200 has knowledge of $D_{U1}$, $D_U$ and $N_U$, thus allowing the processor 300 of the user's PC 200 to determine $D_{U2}$ based on the relationship $D_{U1}*D_{U2}=D_U \bmod \Phi(N_U)$, and thereby complete the splitting of $D_U$.

Similarly, after the determination of $D_{U1}'$, the user's PC 200 has knowledge of $D_{U1}'$, $D_U$ and $N_U$. Accordingly, in step 910, the processor 300 of the user's PC 200 determines $D_{U2}'$ based on the relationship $D_{U1}'*D_{U2}'=D_U \bmod \Phi(N_U)$, and thereby completes the splitting of $D_U$.

For those cases in which it is desired to use $F_p$, $D_{USB}$ and $D_{tether}$ as the multiple factors, the following equation for determining $D_{U1}'$ can be used:

$$D_{U1}'=\text{PKCS-5}(\text{sign}\{\text{Sha-1}(\text{sign}\{\text{Sha-1}(\text{password}), D_{tether}\}),D_{USB}\},\text{modified salt,modified iteration count}) \qquad (7)$$

Thus, as shown in equation (7), $D_{U1}'$ is computed by taking a first Sha-1 hash of the password, where Sha-1 (password) $=F_p$, and transforming this quantity with $D_{tether}$, taking a second Sha-1 hash of the transformed quantity and transforming the second Sha-1 hash with $D_{USB}$, and then using the result of this second transformation as an input to the PKCS-5 algorithm, along with the modified salt and the modified iteration count. After the determination of $D_{U1}'$, the user's PC 200 has knowledge of $D_{U1}'$, $D_U$ and $N_U$. Accordingly, the processor 300 of the user's PC 200 can determine $D_{U2}'$ based on the relationship $D_{U1}'*D_{U2}'=D_U \bmod \Phi(N_U)$, and thereby complete the splitting of $D_U$.

For those cases in which it is desired to use the password and $D_{tether}$ as one of the multiple factors, but not $D_{USB}$, the following equation for determining $D_{U1}'$ can be used:

$$D_{U1}'=\text{PKCS-5}(\text{sign}\{\text{Sha-1}(\text{password}),D_{tether}\},\text{modified salt,modified iteration count}) \qquad (8)$$

Thus, as shown in equation (8), $D_{U1}'$ is computed by taking a first Sha-1 hash of the password, where Sha-1 (password) $=F_p$, and transforming this quantity with $D_{tether}$, and then using the result of this transformation as an input to the PKCS-5 algorithm, along with the modified salt and the modified iteration count. Here again, after the determination of $D_{U1}'$, the user's PC 200 has knowledge of $D_{U1}'$, $D_U$ and $N_U$. Accordingly, the processor 300 of the user's PC 200 can determine $D_{U2}'$ based on the relationship $D_{U1}'*D_{U2}'=D_U \bmod \Phi(N_U)$, and thereby complete the splitting of $D_U$.

After the processor 300 of the user's PC 200 determines $D_{U2}'$, at step 915 the processor 300 destroys $D_U$ and $D_{U1}'$.

—Distribution of the User's Multifactor Split Asymmetric Crypto-Key—

At step 920, the processor 300 directs transmission of $D_{U2}'$, $E_U$ and $N_U$ to the entity with which the user is establishing a multifactor asymmetric crypto-key. As discussed above, the entity could be a sponsor, merchant or distinguished entity represented on the network by a server as discussed above. However, in this implementation the transmission is to sponsor station 50 via network 10. In accordance with the processor directive, the modem 360 transmits $D_{U2}'$, $E_U$ and $N_U$ via the I/O port 365. The sponsor station server 400 receives $D_{U2}'$, $E_U$ and $N_U$ via the I/O port 565. The received $D_{U2}'$, $E_U$ and $N_U$ are directed by the modem 560 to the processor 500. It should be appreciated that this transmission could be broken into multiple transmissions, and could be encrypted with the symmetric key/one time activation code, or even another asymmetric key. Preferably, at least the transmitted $D_{U2}'$ is encrypted. Of course, as desired, either or both of $E_U$ and $N_U$ could also be encrypted. It will also be recognized that the transmission in steps 620, 660 and/or 920 could be combined in a single transmission, if so desired.

Optionally and preferably, at step 922, the processor 500 of the sponsor server 400 encrypts $D_{U2}'$, i.e. ciphertext $CD_{U2}'=\text{Encrypt}(D_{RU2}' K_{DU2}')$ and $Eu$, i.e. ciphertext $CE_U=\text{Encrypt}(E_U,K_{EU})$. One option is to encrypt $D_{U2}'$ and/or $E_U$ using a key that has been generated by and stored on the sponsor server 400, such as a symmetric key. Another option is to encrypt $D_{U2}'$ and/or $E_U$ using a key that is built into the operating system or other software that is being executed by processor 500 of the sponsor's server 400. It will be recognized that the key(s) used to encrypt $D_{U2}'$ and/or $E_U$ could be asymmetric or symmetric.

At step 925, the processor 500, in turn, directs the storage of optionally encrypted $D_{U2}'$, $E_U$ and $N_U$ in association with $E_{USB}$, $N_{USB}$ and $E_R$, $N_R$, preferably on the hard disk 525 of the sponsor station server 400. $D_{U2}'$, $E_U$ and $N_U$ are preferably stored in a persistent state on hard disk 525, in association with a user's identifier (ID) and therefore also with $D_{U2}$.

At step 927, after directing transmission of $D_{U2}'$, $E_U$ and $N_U$ at step 920, the processor 300 of the user's PC 200 destroys $D_{U2}'$. The processor 300 may also destroy $E_U$ and $N_U$, if so desired.

As discussed above with reference to FIGS. 6A-6C, alternatively the key association entity, in this implementation sponsor station 50, could generate the third asymmetric crypto-key pair i.e. $D_U$ and $E_U$, and perform the splitting of $D_U$. If a device representing an entity other than the applicable user generates the third asymmetric crypto-key pair and performs the splitting, it need not provide any associated information to the user's PC 200. However, preferably the user will provide the password to the generating device for use with the PKCS-5 algorithm. Also, the generating device having generated $D_{U1}'$ and $D_{U2}'$ destroys $D_{U1}'$, $D_U$ and the password, and stores optionally encrypted $D_{U2}'$, preferably on a hard disk and in a persistent state.

Login Protocol-with Non-Persistent and Persistent Keys

The entity to which the user device 30 directed the transmissions described in steps 620, 660 and 920, in this implementation a sponsor represented by the sponsor station 50, provides trusted authentication of an individual user during login. For this implementation, the login protocol is described in the context of a request for authentication being received by the user device 30 from the sponsor station 50. However, as has been discussed in detail above, requests for authentication could be received from other than the sponsor station 50 and the authentication request from the sponsor station 50 may represent an authentication request initiated by an entity other than the sponsor. Furthermore, if the user device 30 had directed the transmissions described in steps 620, 660 and 920 to an entity other than the sponsor station 50, the authentication request could represent an authentication request initiated by a sponsor represented by sponsor station 50. Additionally, a merchant server or a distinguished server might also functioned as the sponsor server 50, although generally this will not be the case.

—Initial Authentication and Login for a Session—

As described above with reference to FIGS. 7A and 7B, a communication session is established between the user device 30 and the sponsor station 50 via network 10 at step 700, and the processing proceeds with steps 705-770, as described with reference to FIGS. 7A and 7B.

As described above with reference to FIG. 7B, after entry of the user's passwork at step 770, the user device 30, at step 775, computes $D_{U1}$. As described above with reference to step 800 of FIG. 8, after computing $D_{U1}$, the user network device 30 creates a signed permission request (SPR) using only $D_{U1}$, and $D_{USB}$, i.e. ciphertext CSPR=Encrypt(sign(PR,$D_{USB}$), $D_{U1}$).

Figure 8:
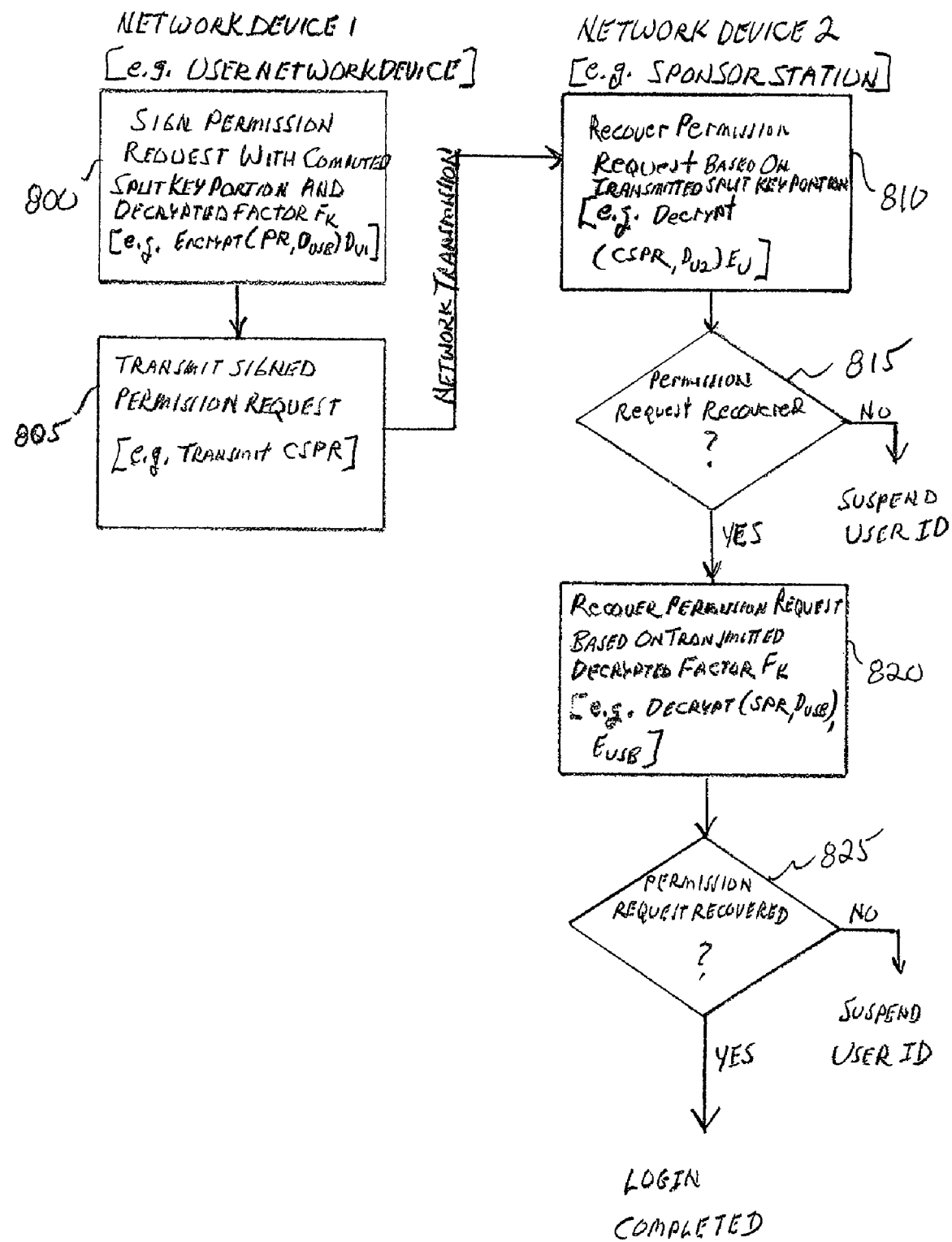
FIG. 8 depicts a flow chart showing other operations performed during the user log-in protocol, including user authentication and completion of login requirements.
Figure 10:
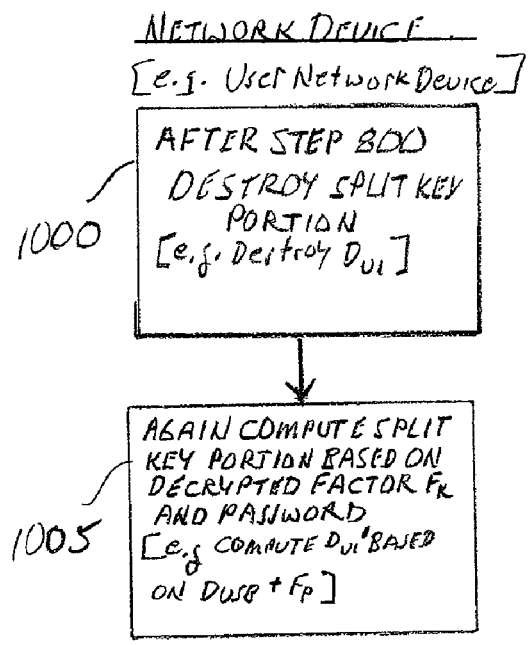
FIG. 10 depicts a flow chart showing other operations performed during the user log-in protocol, including generating and distributing a persistent key, in accordance with the present invention.

Referring now to FIG. 10, preferably immediately after creating the SPR, but in any event promptly after completing the initial login, as shown in FIG. 8, and prior to computing $D_{U1}$' as will be described below, in step 1000 the processor 300 of the user device 30 destroys $D_{U1}$. At step 1005, the processor 300 of the user device 30 computes $D_{U1}$' by taking a first Sha-1 hash of the user's password, where Sha-1 (password)=$F_p$, transforming this quantity with $D_{USB}$, i.e. ciphertext $CF_p$=Encrypt ($F_p$, $D_{USB}$), and then using the result of this transformation, i.e. $CF_p$, as an input to the PKCS-5 algorithm, along with the modified salt and the modified iteration count.

Thus, after completing step 775 of the initial login procedure for a session, the first split is completed and the user device 30 has knowledge of the first private key portion $D_{U1}$ of the first split of the private key $D_U$ of the user's asymmetric crypto-key, and initial authentication and login is completed based on the first split, i.e. based on the private key portions $D_{U1}$ and $D_{U2}$, as described with reference to FIG. 8, and $D_{U1}$ is destroyed in step 1000 so as not to be useable again during the session. After performing step 1005 of the initial login procedure for the session, the second split is completed and the user device 30 has knowledge of the first private key portion $D_{U1}$' of the second split of the private key $D_U$ of the user's asymmetric crypto-key. The session can now continue based on the second split, i.e. based on the private key portions $D_{U1}$' and $D_{U2}$', as will be described with reference to FIG. 11.

—Subsequent Authentications and Logins During the Session—

Figure 11:
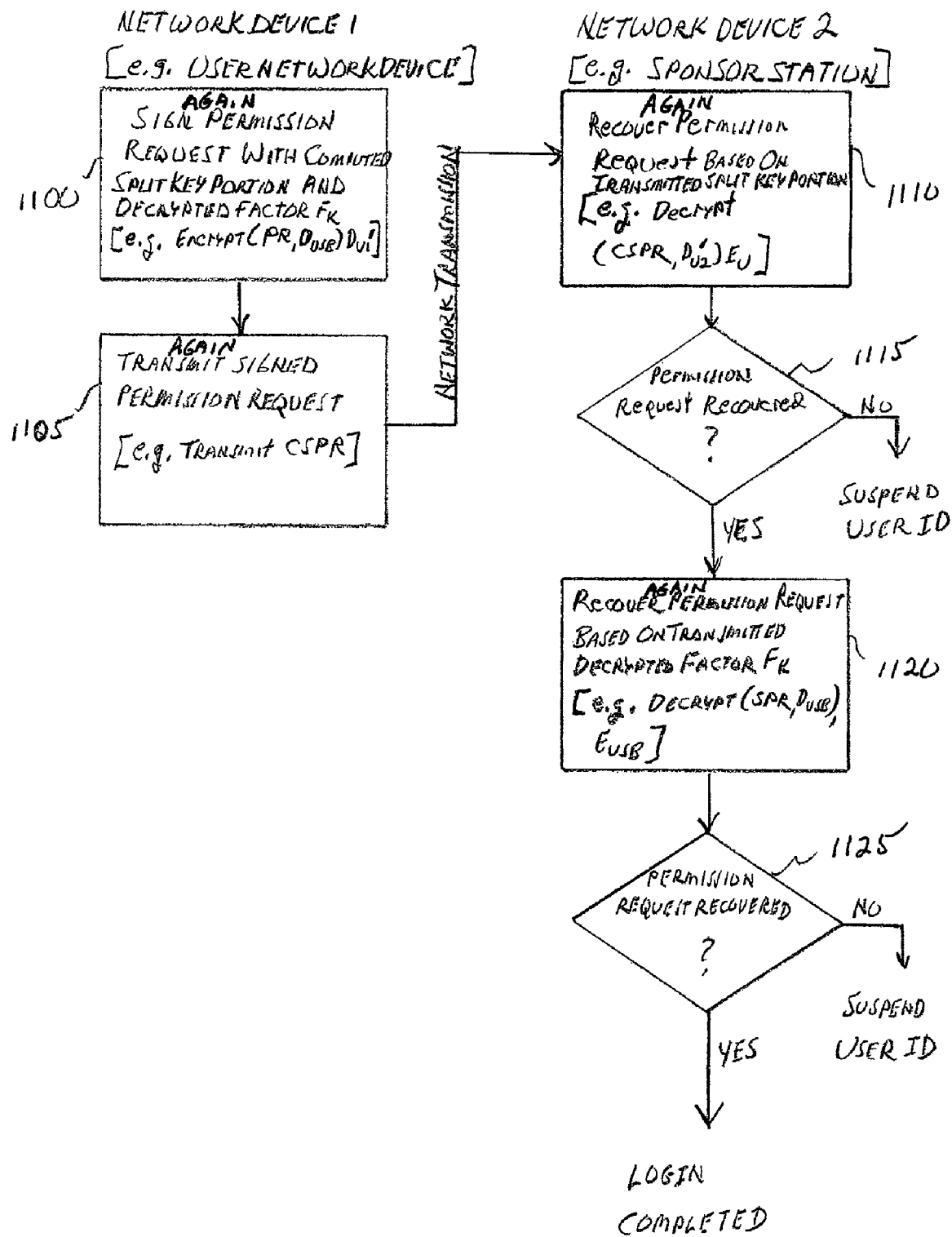
FIG. 11 depicts a flow chart showing other operations performed during the user log-in protocol, including user authentication and completion of login requirements with a persistent key, in accordance with the present invention.

Referring now to FIG. 11, because in this implementation only two factors are used to generate the persistent private key portion $D_{U1}$', at step 1100 the processor 300 of user network device 30 creates a signed permission request (SPR) to access other network sites or other information during the session using only $D_{U1}$' and $D_{USB}$, i.e. ciphertext CSPR=Encrypt (sign(PR,$D_{USB}$), $D_{U1}$'). Again, neither the rolling key nor the password related factor $F_p$ are applied. It should, however, be noted that while the factor corresponding to the password, i.e, $F_p$, is preferably not used, it could be used in the SPR if so desired. The signed permission request to access each site or Web page requiring separate authentication or login has the following form:

$$\text{CSPR}=(PR,\text{sign}(\text{Sha-1}(PR),D_{USB}))D_{U1}' \qquad (9)$$

Thus, in this implementation PR is combined with a Sha-1 hash of PR signed with $D_{USB}$, and this combination is then encrypted with $D_{U1}$'. If an additional factor(s) were used to generate the split private key portion $D_{U1}$' in the present implementation, Sha-1 hash of PR signed with each additional factor and encrypted with $D_{U1}$' would also preferably be included in the a signed permission request (SPR). At step 1105, the processor 300 of user device 30 directs, and in accordance with this directive the modem 360 and I/O port 365 function to transmit CSPR to the sponsor station 50 via network 10.

The I/O port 565 receives the transmitted CSPR and modem 560 directs the received CSPR to processor 500. In step 1110, the processor of sponsor station 50 decrypts, if necessary, and applies $D_{U2}$', $E_U$ and $N_U$, which as discussed above have been previously stored by the sponsor station 50, to decrypt and thereby recover PR and sign (Sha-1 (PR), $D_{USB}$), i.e. Decrypt(CSPR, $D_{U2}$')$E_U$=PR+sign(Sha-1 (PR), $D_{USB}$). In step 1115, the processor 500 verifies that the challenge included in the recovered PR is correct and, if so, thereby explicitly verifies the user's knowledge of $D_{U1}$'. If not, the sponsor station processor 500 may suspend the user's ID.

At step 1120, the processor 500 of sponsor station 50 decrypts, if necessary, and applies $E_{USB}$ and $N_{USB}$, which as discussed above have also been previously stored at the sponsor station 50, to decrypt and recover PR from sign (Sha-1 (PR), $D_{USB}$), i.e. Decrypt(SPR, $D_{USB}$)$E_{USB}$=$P_R$. In step 1125, the processor 500 verifies that the challenge included in this recovered PR is correct and, if so, thereby explicitly verifies the user's knowledge of $D_{USB}$. If not, the processor 500 suspends the user ID. The successful completion of steps 1115 and 1125 explicitly verifies the user's knowledge of $D_{U1}$' and $D_{USB}$.

Furthermore, the successful completion of steps 1110-1125 implicitly verify the user's knowledge of the user's password, and hence also of factor $F_p$ and other factors, if any, required to correctly construct $D_{U1}$'. It will be recognized that, if desired, the user's knowledge of any of such other factors could be explicitly verified by the sponsor station 50 in a manner similar to that described with reference to steps 1120 and 1125, although this is not mandatory, and one or more of such direct additional verifications may be omitted depending on the implementation.

In this implementation, upon successful completion of step 1125, the user is again authenticated and, based on this authentication, the user device 30 will be logged-in and allowed access to another network site or to different information at the current network site. Thus, following completion of the subsequent authentication based on the second split, the sponsor station 50 and the user device 30 interact using $D_{U1}$' and $D_{U2}$', and not $D_{U1}$ and $D_{U2}$, to authenticate the user for access to one or more addition sites or Web pages after completion of initial authentication and login using $D_{u1}$ And $D_{u2}$.

As described above, the generated private key portion, e.g. $D_{U1}$, from the first split of the private key, e.g. $D_U$, of the user's asymmetric crypto-key is used only once for the initial session authentication and login after it has been generated, and is then destroyed. Accordingly, it need only be stored on, for example, a RAM during a very limited period of time, and therefore available to an attacker for a very limited time period. As a result $D_{U1}$ remains relatively secure.

Furthermore, the generated private key portion, e.g. $D_{U1}$', from the second split of the private key, e.g. $D_U$, of the user's asymmetric crypto-key is allowed to be used repeatedly without requiring the user to reenter the user's password, or recreate the private key portion, e.g. $D_{U1}$', for every successive use. Thus, the user is not required to reenter the user's password or recreate $D_{U1}$' again and again and again to obtain access to different information at the same Web site or to information at different network sites during a session.

In summary, the private key portion, e.g. $D_{U1}$, from the first split of the private key, e.g. $D_U$, remains relatively secure, since its availability to an attacker is very limited in time. Thus the security of $D_{U1}$, which is required for each login, remains strong. The generated private key portion, e.g. $D_{U1}$', from the second split of the private key, e.g. $D_U$, can be used repeatedly after the initial session login using $D_{U1}$, and therefore the user can access multiple sites or different information on the same site during the session without inconvenience.

Even if the private key portion from the second split, e.g. $D_{U1}$', is stolen by an attacker, the attacker can make improper use of the key portion to impersonate the user during only limited period of use. The attacker must then prove knowledge of the relatively secure private key portion from the first split, e.g. $D_{U1}$, in order to continue impersonating the user.

Accordingly, a better technique is provided for maintaining the security of the private key portion of the user's asymmetric crypto-key, without requiring the user to recreate a private key in order to access different network sites or different information at a network site during a session.

It will also be recognized by those skilled in the art that, while the invention has been described above in terms of one or more preferred embodiment(s), it is not limited thereto. Various features and aspects of the above described invention may be used individually or jointly. Further, although the invention has been described in the context of its implementation in a particular environment and for particular purposes, e.g. in providing security for network communications, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

What is claimed is:

1. A system for generating an asymmetric crypto-key associated with a user, comprising:
a storage device configured to store a random number generation function having a constant; and
a processor configured with logic to (i) generate an asymmetric crypto-key associated with the user, the asymmetric crypto-key including a private key and a public key, (ii) compute a first key portion based on the stored random number generation function and a first value of the constant, and compute the second key portion based on the computed first key portion and one of the private key and the public key, wherein the computed first key portion and the computed second key portion form a first split of the one key of the user asymmetric crypto-key, and (iii) compute another first key portion based on the stored random number generation function and a second value of the constant, different than the first constant value, and compute another second key portion based on the computed other first key portion and the one key, wherein the computed other first key portion and the computed other second key portion form a second split of the one key of the user asymmetric crypto-key.

2. The system according to claim 1, wherein:
the stored random number generation function is the Public Key Cryptography Standard-5 (PKCS-5) algorithm; and
the constant is one of a salt and an iteration count.

3. The system according to claim 1, wherein:
the constant is a first constant;
the stored random number generation function also includes a second constant;
the processor further configured to (i) compute the first key portion based also on a first value of the second constant, and (ii) compute the other first key portion based also on a second value of the second constant, wherein the second value of the second constant is different than the first value of the second constant.

4. The system according to claim 3, wherein:
the stored random number generation function is the PKCS-5 algorithm;
the first constant is a salt; and
the second constant is an iteration count.

5. The system according to claim 1, wherein:
the second key portion is computed in accordance with the formula: $D_{U1}*D_{U2}=D_u \bmod \Phi(N_U)$, where $D_U$ represents the one key of the generated user asymmetric crypto-key, $D_{U1}$ represents the computed first key portion, and $D_{U2}$ represents the second key portion to be computed; and
the other second key portion is computed in accordance with the formula: $D_{U1}'*D_{U2}'=D_U \bmod \Phi(N_u)$, where $D_U$ represents the one key of the generated user asymmetric crypto-key, $D_{U1}'$ represents the computed other first key portion, and $D_{U2}'$ represents the other second key portion to be computed.

6. The system according to claim 1, wherein:
the stored random number generation function also has multiple factors, including a first factor and a second factor; and
the processor is further configured to compute the first key portion based also on a value of the first factor and a value of the second factor, and the other first key portion based also on the value of the first factor and the value of the second factor.

7. The system according to claim 6, wherein:
the first factor corresponds to a password of the user; and
the second factor corresponds to one of another private key and another public key of another asymmetric crypto-key which includes the other private key and the other public key.

8. The system according to claim 7, wherein:
the storage device is further configured to also store a value of the one other key of the other asymmetric crypto-key;
the processor is further configured to receive a user input representing the user password;
the first key portion is computed based on the received user password and the stored value of the one other key of the other asymmetric crypto-key; and
the other first key portion is computed based on the received user password and the stored value of the one other key of the other asymmetric crypto-key.

9. The system according to claim 7, further comprising:
a removable storage device configured to be temporarily interconnected with the processor, and to store a value of the one other key of the other asymmetric crypto-key;
wherein the processor is further configured to receive a user input representing the user password;
wherein the first key portion is computed based on the received user password and the stored value of the one other key of the other asymmetric crypto-key, and the other first key portion is computed based on the received user password and the stored value of the one other key of the other asymmetric crypto-key.

10. The system according to claim 6, wherein:
the storage device is further configured to store a value of one of the first factor and the second factor; and
both the first key portion and the other first key portion are computed based on the stored value of the one factor.

11. A method for generating an asymmetric crypto-key associated with a user, comprising:
generating an asymmetric crypto-key associated with the user, the asymmetric crypto-key including a private key and a public key;
computing a first key portion based on a random number generation function having a constant, and a first value of the constant;
computing the second key portion based on the computed first key portion and one of the private key and the public key;
computing another first key portion based on the random number generation function and a second value of the constant, different than the first constant value; and computing another second key portion based on the computed other first key portion and the one key;

wherein the computed first key portion and the computed second key portion form a first split of the one key of the asymmetric crypto-key, and the computed other first key portion and the computed other second key portion form a second split of the one key of the asymmetric crypto-key.

12. The method according to claim 11, wherein:

the random number generation function is the PKCS-5 algorithm; and the constant is one of a salt and an iteration count.

13. The method according to claim 11, wherein:

the constant is a first constant;

the random number generation function also includes a second constant;

the first key portion is computed based also on a first value of the second constant;

the other first key portion is computed based also on a second value of the second constant; and the second value of the second constant is different than the first value of the second constant.

14. The method according to claim 13, wherein:

the random number generation function is the PKCS-5 algorithm;

the first constant is a salt; and the second constant is an iteration count.

15. The method according to claim 11, wherein:

the second key portion is computed in accordance with the formula: $D_{U1}*D_{U2}=D_U \mod \Phi(N_U)$, where $D_U$ represents the one key of the generated asymmetric crypto-key, $D_{U1}$ represents the computed first key portion, and $D_{U2}$ represents the second key portion to be computed; and the other second key portion is computed in accordance with the formula: $D_{U1}'*D_{U2}'=D_U \mod \Phi(N_U)$, where $D_U$ represents the one key of the generated asymmetric crypto-key, $D_{U1}'$ represents the computed other first key portion, and $D_{U2}'$ represents the other second key portion to be computed.

16. The method according to claim 11, wherein:

the random number generation function also has multiple factors, including a first factor and a second factor;

the first key portion is computed based also on a value of the first factor and a value of the second factor; and the other first key portion is computed based also on the value of the first factor and the value of the second factor.

17. The method according to claim 16, wherein:

the first factor corresponds to a password of the user; and the second factor corresponds to one of another private key and another public key of another asymmetric crypto-key which includes the other private key and the other public key.

18. The method according to claim 17, further comprising:

receiving the user password;

wherein the first key portion is computed based on the received user password and a value of the one other key of the other asymmetric crypto-key, and the other first key portion is computed based on the received user password and the value of the one other key of the other asymmetric crypto-key.

19. The method according to claim 17, further comprising:

storing a value of the one other key of the other asymmetric crypto-key; and receiving a user input representing the user password;

wherein the first key portion is computed based on the received user input and the stored value of the one other key of the other asymmetric crypto-key, and the other first key portion is computed based on the received user input and the stored value of the one other key of the other asymmetric crypto-key.

20. The method according to claim 16, further comprising:

persistently storing a value of one of the first factor and the second factor;

wherein both the first key portion and the other first key portion are computed based on the stored value of the one factor.

* * * * *